(12) United States Patent
Kim et al.

(10) Patent No.: US 9,834,446 B2
(45) Date of Patent: Dec. 5, 2017

(54) METHOD FOR PREPARING HYDROPHOBIC SILICA AEROGEL

(71) Applicant: LG CHEM, LTD., Seoul (KR)

(72) Inventors: Mi Ri Kim, Daejeon (KR); Kyoung Shil Oh, Daejeon (KR); Ye Hon Kim, Daejeon (KR); Dong Hyun Cho, Daejeon (KR); Young Sam Kim, Daejeon (KR); Sung Min Yu, Daejeon (KR); Jin Hee Oh, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 229 days.

(21) Appl. No.: 14/653,189

(22) PCT Filed: Feb. 4, 2015

(86) PCT No.: PCT/KR2015/001165
§ 371 (c)(1),
(2) Date: Jun. 17, 2015

(87) PCT Pub. No.: WO2015/119431
PCT Pub. Date: Aug. 13, 2015

(65) Prior Publication Data
US 2016/0280557 A1    Sep. 29, 2016

(30) Foreign Application Priority Data

Feb. 6, 2014  (KR) .................. 10-2014-0013860
Feb. 6, 2014  (KR) .................. 10-2014-0013861
Feb. 4, 2015  (KR) .................. 10-2015-0017242

(51) Int. Cl.
C01B 33/158   (2006.01)
C01B 33/16    (2006.01)
B01J 13/00    (2006.01)

(52) U.S. Cl.
CPC ....... *C01B 33/1585* (2013.01); *B01J 13/0091* (2013.01); *C01B 33/163* (2013.01);
(Continued)

(58) Field of Classification Search
CPC .................................................. C01B 33/1585
See application file for complete search history.

(56) References Cited

U.S. PATENT DOCUMENTS 6,197,270 B1 *  3/2001  Sonoda ............... C01B 33/1585
                                              423/338
7,897,648 B2 *  3/2011  Halimaton .......... C01B 33/1585
                                              106/490
(Continued)

FOREIGN PATENT DOCUMENTS

CN   102951650 A   3/2013
CN   103130231 A   6/2013
(Continued)

OTHER PUBLICATIONS

Ren, Hong-bo, et al., "Fabrication of silica aerogel micro cylinder for ICF target", Journal of Functional Materials, vol. 37, Dec. 2006, pp. 834-836.
(Continued)

*Primary Examiner* — Melvin C Mayes
*Assistant Examiner* — Michael Forrest
(74) *Attorney, Agent, or Firm* — Dentons US LLP

(57) ABSTRACT

Provided are a method for preparing a hydrophobic silica aerogel by the combined use of a first surface modifier and a second surface modifier, and a hydrophobic silica aerogel prepared by using the method. A hydrophobic silica aerogel having excellent physical properties and pore characteristics as well as a high degree of hydrophobicity may be prepared with high efficiency by the preparation method according to the present invention.

36 Claims, 6 Drawing Sheets

(52) U.S. Cl.
CPC ........ *C01B 33/166* (2013.01); *C01P 2006/11* (2013.01); *C01P 2006/12* (2013.01); *C01P 2006/14* (2013.01); *C01P 2006/16* (2013.01); *C01P 2006/17* (2013.01)

(56) References Cited

U.S. PATENT DOCUMENTS

| | | |
|---|---|---|
| 2001/0034375 A1 | 10/2001 | Schwertfeger et al. |
| 2008/0070146 A1 | 3/2008 | Fomitchev et al. |
| 2008/0081014 A1* | 4/2008 | Ahn .................. C01B 33/1585 423/338 |
| 2011/0240907 A1 | 10/2011 | Sharma et al. |
| 2012/0225003 A1 | 9/2012 | Joung et al. |
| 2013/0106008 A1 | 5/2013 | Ahn et al. |

FOREIGN PATENT DOCUMENTS

| | | |
|---|---|---|
| KR | 10-2000-0057244 A | 9/2000 |
| KR | 10-2010-0010350 A | 2/2010 |
| KR | 10-2010-0041737 A | 4/2010 |
| KR | 10-2012-0033159 A | 4/2012 |
| KR | 10-2012-0070948 A | 7/2012 |
| KR | 10-2012-0126741 A | 11/2012 |
| KR | 10-2013-0051304 A | 5/2013 |

OTHER PUBLICATIONS

S.D. Bhagat, et al.: "Textural properties of ambient pressure dried water-glass based silica aerogel beads: One day synthesis", XP028038807, Microporous and Mesoporous Materials, vol. 96, Nov. 26, 2006, pp. 237-244.

* cited by examiner

US 9,834,446 B2

METHOD FOR PREPARING HYDROPHOBIC SILICA AEROGEL

This application is a National Phase of International Application No. PCT/KR2015/001165, filed on Feb. 4, 2015, and claims the benefit of Korean Application No. 10-2014-0013860, filed on Feb. 6, 2014, Korean Application No. 10-2014-0013861, filed on Feb. 6, 2014 and Korean Application No. 10-2015-0017242, filed on Feb. 4, 2015, all of which are hereby incorporated by reference in their entirety.

TECHNICAL FIELD

The present invention relates to a method for preparing a hydrophobic silica aerogel, which may prepare a hydrophobic silica aerogel having excellent tap density and specific surface area with high efficiency, and a hydrophobic silica aerogel prepared by using the method.

BACKGROUND ART

An aerogel, as a high specific area ($\geq 500$ m$^2$/g), ultra-porous material having a porosity of about 90% to 99.9% and pores with a diameter of about 1 nm to about 100 nm, has characteristics such as ultra lightweightness, ultra-insulation, and ultra-low dielectric constant. Due to the excellent physical properties, research into the applications of the aerogel as a transparent insulator and an environmentally-friendly high-temperature insulator, an ultra-low dielectric thin film for a highly integrated device, a catalyst and a catalyst support, an electrode for a super capacitor, and an electrode material for desalination as well as the development of an aerogel material has been actively conducted.

The biggest advantage of the aerogel is super-insulation having a thermal conductivity of 0.300 W/m·K or less which is lower than that of an organic insulation material such as a typical Styrofoam. Also, with respect to the aerogel, there is no fire vulnerability and generation of toxic gas in case of fire, i.e., fatal weaknesses of a typical organic insulation material.

The silica aerogel may be broadly categorized into three forms, powder, granules, and monolith, and among them, the powder form is most common.

Silica aerogel powder may be commercialized in a form, such as an aerogel blanket or aerogel sheet, by compositing with fibers. Also, since the blanket or sheet, which is prepared by using a silica aerogel, has flexibility, it may be bent, folded, or cut to a predetermined size or shape. Thus, the silica aerogel may be used in household goods, such as jackets or shoes, as well as industrial applications such as an insulation panel of a liquefied natural gas (LNG) line, an industrial insulation material and a space suit, transportation and vehicles, and an insulation material for power generation. Furthermore, the silica aerogel may be used in a fire door as well as a roof or floor in a home for fire prevention.

In general, a wet gel is prepared from a silica precursor such as water glass or tetraethoxysilane (TEOS), and an aerogel is then prepared by removing a liquid component in the wet gel without destroying its microstructure. In this case, a hollow of the wet gel is filled with water or alcohol. Accordingly, when the solvent is removed by a subsequent drying process, shrinkage and cracking of a pore structure occur due to high surface tension of water at a gas/liquid interface while the liquid phase solvent is evaporated into a gas phase. As a result, a decrease in specific surface area and changes in pore structure may occur in the finally prepared silica aerogel. Thus, in order to maintain the pore structure of the wet gel, there is a need to substitute water or alcohol having high surface tension with an organic solvent having relatively low surface tension. Also, the dried silica aerogel maintains low thermal conductivity immediately after the drying, but the thermal conductivity may gradually increase because a hydrophilic silanol group (Si—OH) present on the surface of silica absorbs water in the air. Therefore, there is a need to modify the surface of the silica aerogel into hydrophobic in order to maintain low thermal conductivity.

PRIOR ART DOCUMENTS

Patent Document (Patent Document 1) Korean Patent Application Laid-Open Publication No. 2012-0070948 (publication date 2012 Jul. 2)

DISCLOSURE OF THE INVENTION

Technical Problem

An aspect of the present invention provides a method for preparing a hydrophobic silica aerogel, which may prepare a hydrophobic silica aerogel having excellent pore characteristics and high hydrophobicity as well as physical properties, such as excellent tap density and specific surface area, with high efficiency by more effectively performing surface modification by increasing reactivity with a silica sol through the combined use of a first surface modifier having low modification effect but having a good degree of hydrophobicity and a second surface modifier having a low degree of hydrophobicity but having excellent modification effect.

Another aspect of the present invention provides a hydrophobic silica aerogel that is prepared by the above method.

Another aspect of the present invention provides a blanket including the hydrophobic silica aerogel that is prepared by the above method.

Technical Solution

According to an aspect of the present invention, there is provided a method for preparing a hydrophobic silica aerogel including preparing a hydrophobic silica wet gel by adding a first surface modifier that includes two or more hydrophobic groups in one molecule, a second surface modifier that includes two or more reactive groups reactable with a hydrophilic group on a surface of silica, a non-polar organic solvent, and an inorganic acid to a water glass solution and performing a reaction (step 1); and washing and drying the hydrophobic silica wet gel (step 2).

According to another aspect of the present invention, there is provided a hydrophobic silica aerogel that is prepared by the above-described method.

According to another aspect of the present invention, there is provided a blanket including the hydrophobic silica aerogel that is prepared by the above-described method.

Advantageous Effects

A preparation method according to the present invention may more effectively perform surface modification by increasing reactivity with a silica sol through the combined use of a first surface modifier having low modification effect but having a good degree of hydrophobicity and a second surface modifier having a low degree of hydrophobicity but having excellent modification effect. As a result, the method may prepare a hydrophobic silica aerogel having significantly improved physical properties, such as tap density and specific surface area, and pore characteristics with high efficiency while maintaining a good degree of hydrophobicity.

Also, the preparation method is not only highly economical, but may also reduce the amount of waste gas that is generated during a preparation process of the silica aerogel.

Furthermore, since the hydrophobic silica aerogel prepared by the method may have excellent physical properties and pore characteristics as well as high hydrophobicity, the hydrophobic silica aerogel may be suitable for various industrial fields such as insulation materials, catalysts, and low-dielectric thin films.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF REFERENCE NUMERALS

Figure 1:
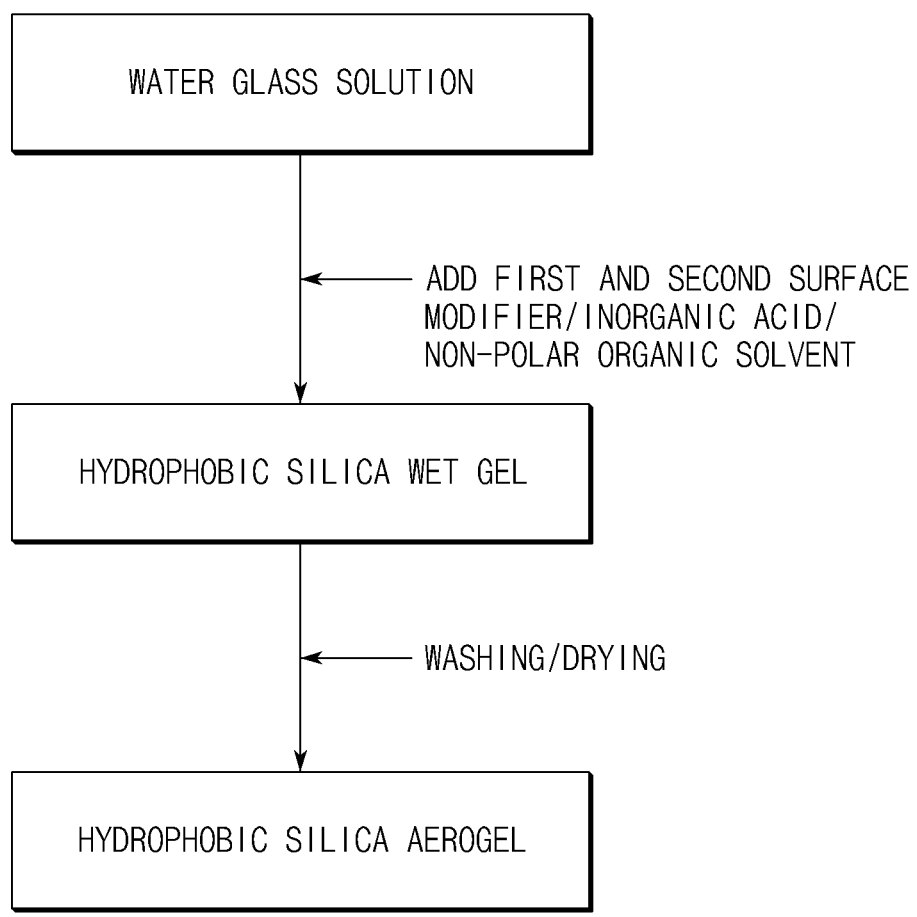
FIG. 1 is a block diagram sequentially illustrating a preparation process of a hydrophobic silica aerogel according to an embodiment of the present invention.

100 Soxhlet extractor
10 extraction solvent reservoir
30 reboiler
40 condenser
50 extractor
60 siphon arm
70 cooling circulation tank

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Typically, an excessive amount of an expensive surface modifier, such as trimethylchlorosilane (TMCS) and hexamethyldisilazane (HMDS), has been used for hydrophobic surface modification of a silica aerogel. However, with respect to the TMSC, chlorine gas and corrosion caused by the chlorine gas may occur during surface modification and the incidence of side reactions may be high. Also, with respect to the HMDS, an effect of surface modification in gel pores may be low due to a bulky molecular structure and the lack of a reactive group on silica. Furthermore, the use of methyltrimethoxysilane (MTMS), which is less expensive than the HMDS and the TMCS, as a surface modifier of the silica aerogel was suggested, but the MTMS may have a low degree of hydrophobicity.

Thus, in the present invention, there is provided a method for preparing a hydrophobic silica aerogel, which may prepare a hydrophobic silica aerogel having excellent physical properties while maintaining a pore structure of the silica aerogel and low thermal conductivity with high efficiency by more effectively performing surface modification by increasing reactivity with a silica sol through the combined use of a first surface modifier having low modification effect but having a good degree of hydrophobicity and a second surface modifier having a low degree of hydrophobicity but having excellent modification effect.

Specifically, the method for preparing a hydrophobic silica aerogel according to an embodiment of the present invention may include preparing a hydrophobic silica wet gel by adding a first surface modifier that includes two or more hydrophobic groups in one molecule, a second surface modifier that includes two or more reactive groups reactable with a hydrophilic group on a surface of silica, a non-polar organic solvent, and an inorganic acid to a water glass solution and performing a reaction (step 1); and washing and drying the hydrophobic silica wet gel (step 2).

FIG. 1 is a block diagram sequentially illustrating a preparation process of a hydrophobic silica aerogel according to an embodiment of the present invention. FIG. 1 is only an example for describing the present invention and the scope of the present invention is not limited thereto. Hereinafter, the present invention will be described in more detail with reference to FIG. 1.

(Step 1)

Step 1 of preparing a hydrophobic silica aerogel according to an embodiment of the present invention is preparing a hydrophobic silica wet gel.

Specifically, the hydrophobic silica wet gel may be prepared by adding first and second surface modifiers, a non-polar organic solvent, and an inorganic acid to a water glass solution and performing a reaction, and in this case, an ion exchange resin may be further selectively used.

For example, the hydrophobic silica wet gel may be prepared by various methods according to the sequence of adding the above-described compounds.

FIGS. 2A to 2D are block diagrams respectively illustrating various methods (methods A to D) of preparing a hydrophobic wet gel during the preparation of the hydrophobic silica aerogel according to the embodiment of the present invention. FIGS. 2A to 2D are only examples for describing the present invention and the scope of the present invention is not limited thereto. Hereinafter, the present invention will be described with reference to FIGS. 2A to 2D.

Figure 2A:
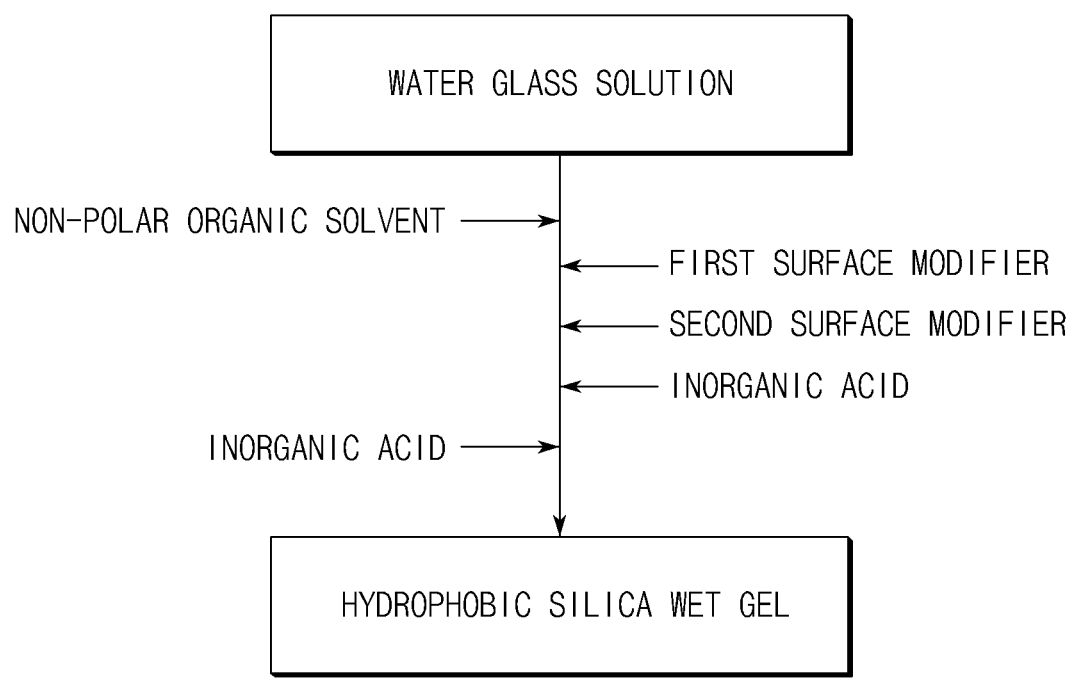
FIGS. 2A to 2D are block diagrams respectively illustrating various methods (methods A to D) for preparing a hydrophobic wet gel during the preparation of the hydrophobic silica aerogel according to the embodiment of the present invention.

Specifically, as illustrated in FIG. 2A, the hydrophobic silica wet gel may be prepared by a method (method A) which includes: adding a non-polar organic solvent to a water glass solution to prepare a water glass-non-polar organic solvent layer separation composition which includes a water glass solution layer and a non-polar organic solvent layer; and adding a first surface modifier, a second surface modifier, and an inorganic acid to the water glass-non-polar organic solvent layer separation composition and reacting to prepare a hydrophobic silica wet gel.

Figure 2B:
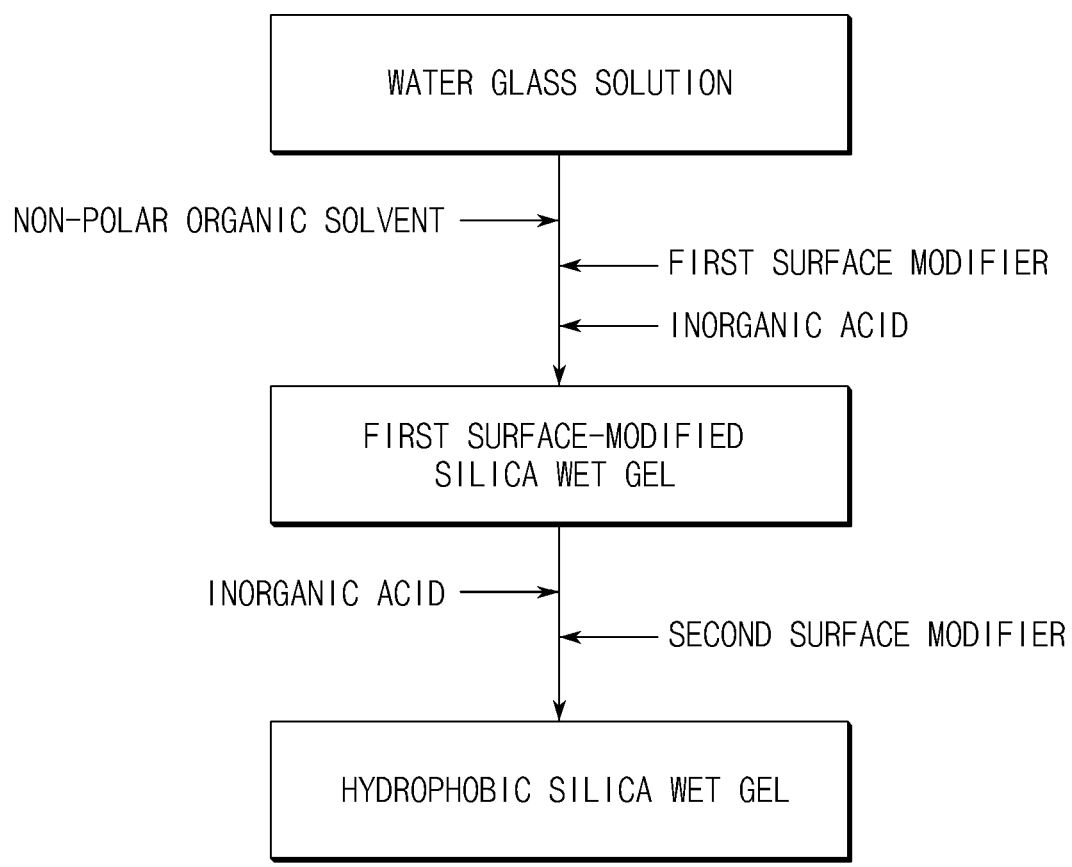

Also, as illustrated in FIG. 2B, the hydrophobic silica wet gel may be prepared by a method (method B) which includes: adding a non-polar organic solvent to a water glass solution to prepare a water glass-non-polar organic solvent layer separation composition which includes a water glass solution layer and a non-polar organic solvent layer; adding a first surface modifier and an inorganic acid to the water glass-non-polar organic solvent layer separation composition and reacting to prepare a first surface-modified silica wet gel; and adding an inorganic acid and a second surface modifier to the first surface-modified silica wet gel and reacting to prepare a hydrophobic silica wet gel.

Figure 2C:
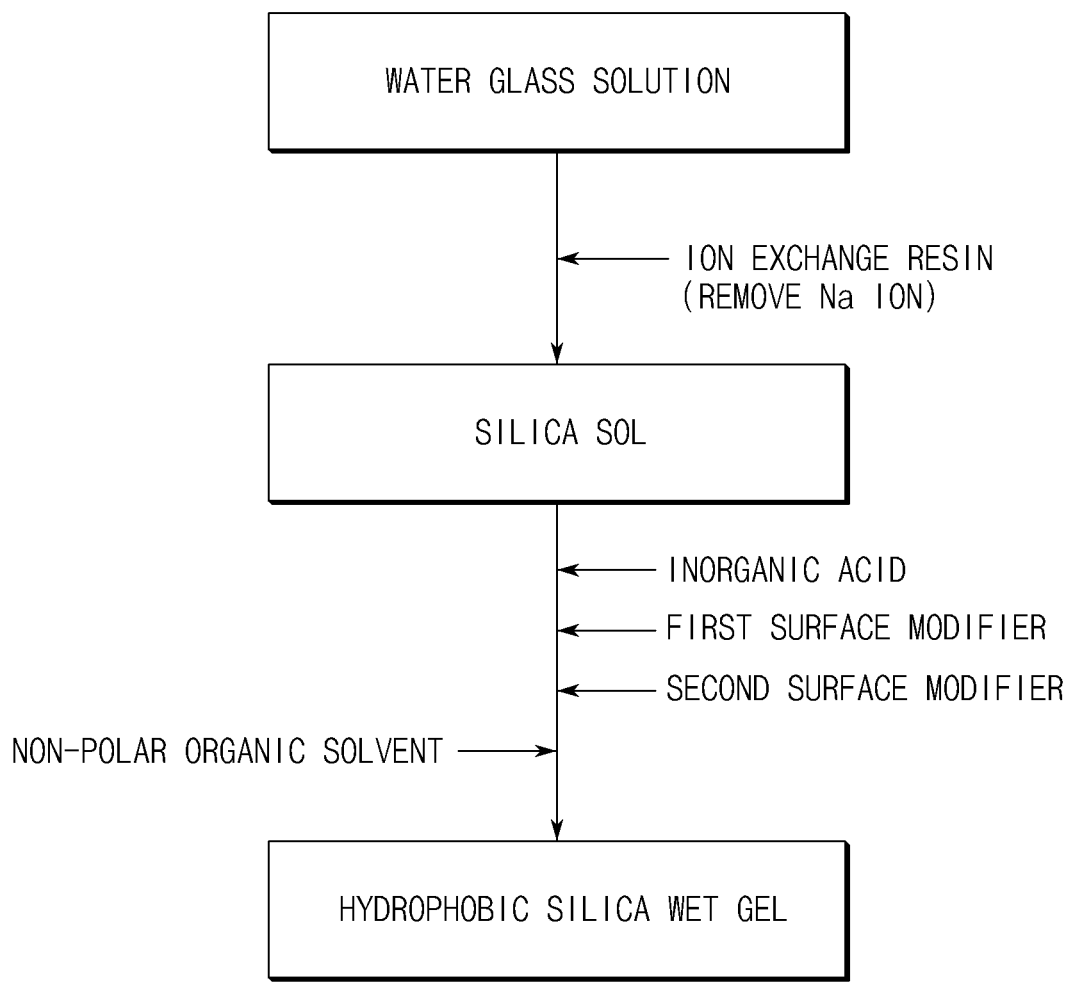

In a case where an ion exchange resin is further selectively used, the hydrophobic silica wet gel, as illustrated in FIG. 2C, may be prepared by a method (method C) which includes: passing a water glass solution through an ion exchange resin to prepare a silica sol; and adding an inorganic acid, first and second surface modifiers, and a non-polar organic solvent to the silica sol and reacting to prepare a hydrophobic silica wet gel.

Figure 2D:
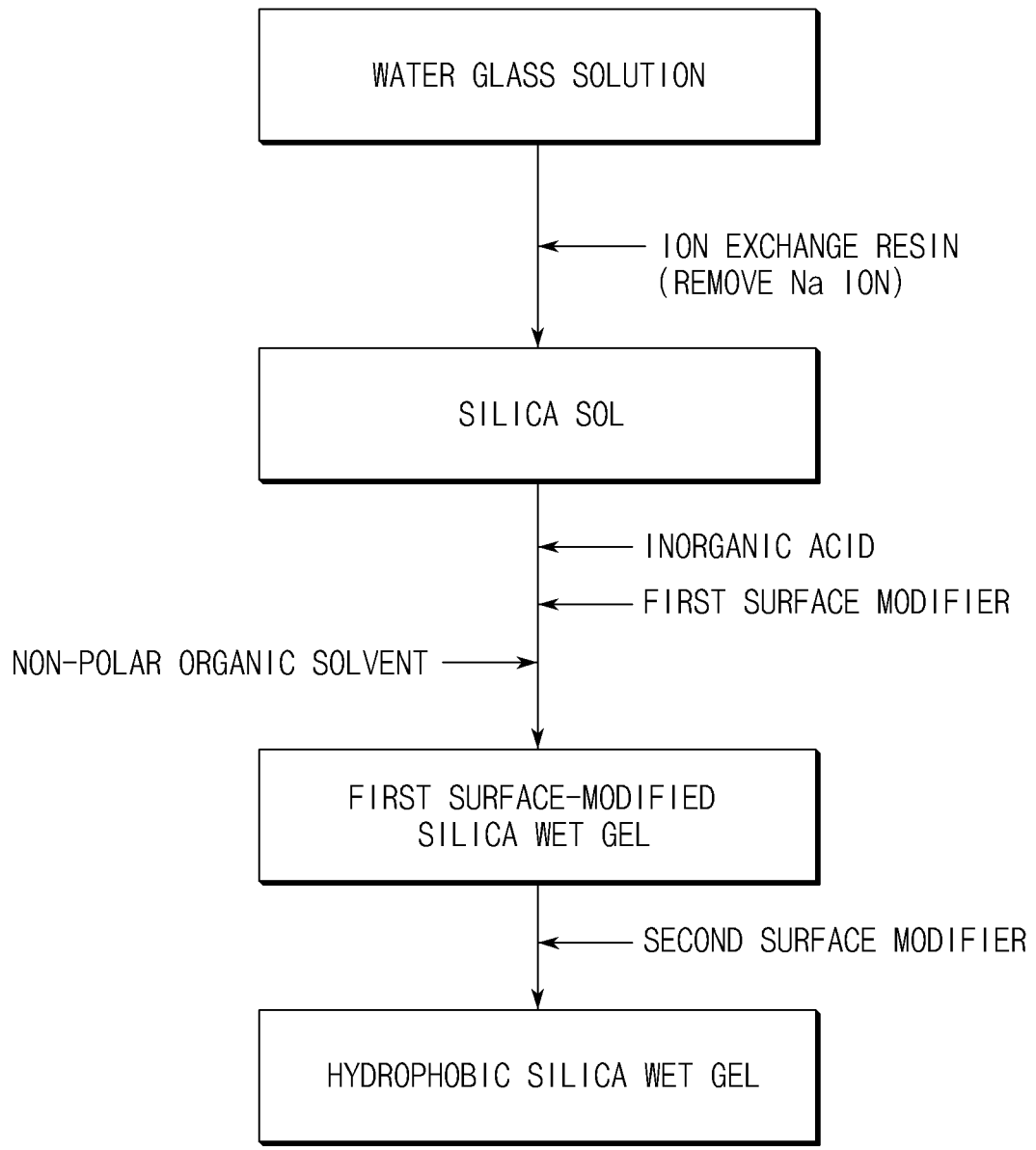

Furthermore, in a case where an ion exchange resin is further selectively used, the hydrophobic silica wet gel, as illustrated in FIG. 2D, may be prepared by a method (method D) which includes: passing a water glass solution through an ion exchange resin to prepare a silica sol; adding an inorganic acid, a first surface modifier, and a non-polar organic solvent to the silica sol and reacting to prepare a first surface-modified silica wet gel; and adding a second surface modifier to the first surface-modified silica wet gel and reacting to prepare a hydrophobic silica wet gel.

As described above, the method for preparing a hydrophobic silica wet gel may be categorized as methods A and B, in which the hydrophobic silica wet gel is prepared after preparing the water glass-non-polar organic solvent layer separation composition, and methods C and D in which the hydrophobic silica wet gel is prepared after preparing the silica sol by using the ion exchange resin. Also, the methods A and B and the methods C and D may be respectively categorized according to a method of adding the first and second surface modifiers on the basis of gelation, i.e., whether it is a method of simultaneously adding the first and second surface modifiers or a split addition method in which the first surface modifier is added before the gelation and the second surface modifier is added after the gelation. Furthermore, solvent substitution, surface modification, and gelation may be simultaneously performed during the preparation of a hydrophobic silica wet gel according to the methods A to D. Hereinafter, each method will be described in more detail.

Method A

As illustrated in FIG. 2A, the method A for preparing a hydrophobic silica wet gel includes the steps of adding a non-polar organic solvent to a water glass solution to prepare a water glass-non-polar organic solvent layer separation composition which includes a water glass solution layer and a non-polar organic solvent layer (step A-1), and adding a first surface modifier, a second surface modifier, and an inorganic acid to the water glass-non-polar organic solvent layer separation composition and reacting to prepare a hydrophobic silica wet gel (step A-2).

In step A-1 of the method A for preparing a hydrophobic silica wet gel, the water glass-non-polar organic solvent layer separation composition may be prepared by adding a non-polar organic solvent to a water glass solution, and as a result, the layer separation composition is prepared in which the water glass solution and the non-polar organic solvent are not mixed but are respectively separated as a separate layer. Specifically, the layer separation composition includes a water glass solution layer and a non-polar organic solvent layer which is disposed on the water glass solution layer. Accordingly, when adding a surface modifier in a subsequent step, a layer, in which the surface modifier is dispersed, may vary depending on the hydration of the surface modifier. Specifically, a hydrated surface modifier is dispersed in the water glass solution layer, an unhydrated surface modifier is dispersed in the non-polar organic solvent layer, and a modification reaction of the silica wet gel occurs at an interface between the water glass solution layer and the non-polar organic solvent layer.

Also, during the preparation of the water glass-non-polar organic solvent layer separation composition, a mixing process for obtaining a uniform temperature distribution in the composition may be performed.

The mixing process may be performed according to a typical mixing method and is not particularly limited. Specifically, the process may be performed by stirring at a temperature of 40° C. to 60° C. In this case, the stirring is not particularly limited, but may be performed for 30 minutes or more, for example, 1 hour to 4 hours.

The water glass solution used in the preparation of the water glass-non-polar organic solvent layer separation composition is a dilute solution which is prepared by adding water, specifically, distilled water, to water glass and mixing the solution. Also, the water glass is not particularly limited, but may include silica ($SiO_2$) in an amount of 28 wt % to 35 wt %. Furthermore, the water glass solution diluted by adding water may include silica in an amount of 0.1 wt % to 30 wt %, and the water glass solution may be diluted so as to have different silica contents according to the first surface modifier and second surface modifier to be described later, or the hydration thereof. Specifically, in the case that the first surface modifier and second surface modifier to be described later are not hydrated, the water glass solution may include silica in an amount of 0.1 wt % to 10 wt %. Also, in the case in which at least one of the first surface modifier and the second surface modifier is hydrated, since the water glass solution may be further diluted by distilled water that is included in the hydrated material, the water glass solution may include silica in an amount of 3 wt % to 30 wt %.

Also, the non-polar organic solvent used in the preparation of the water glass-non-polar organic solvent layer separation composition may prevent the shrinkage of pores and cracking, which may occur when water present in a hollow of a subsequently prepared hydrophobic silica wet gel is evaporated into a gas phase during the drying of the hydrophobic silica wet gel, by substituting the water present in the hollow of the hydrophobic silica wet gel. As a result, a decrease in specific surface area and changes in pore structure, which occur during the drying of the hydrophobic silica wet gel, may be prevented. Specifically, the non-polar organic solvent may include hexane, heptane, toluene, or xylene, and any one thereof or a mixture of two or more thereof may be used. Furthermore, the non-polar organic solvent, for example, may be hexane in consideration of the effect of preventing the decrease in specific surface area and the changes in pore structure due to the use of the non-polar organic solvent.

The water glass solution and the non-polar organic solvent may be used in a volume ratio of 1:1 to 1:2, and specifically, may be used in a volume ratio of 1:1 to 1:1.5. In this case, the water glass solution, as described above, may include silica in an amount of 0.1 wt % to 30 wt %. In the case that the volume ratio of the non-polar organic solvent to the water glass solution is less than 1, since a substitution ratio of the water present in the hollow of the hydrophobic silica wet gel may decrease, the effect of preventing the decrease in specific surface area and the changes in pore structure may be insignificant. In contrast, in the case in which the volume ratio of the non-polar organic solvent to the water glass solution is greater than 2, the improvement due to an increase in the amount of the non-polar organic solvent used may be insignificant, and there is a risk of decreasing process efficiency and increasing process time due to the use of an excessive amount of the non-polar organic solvent.

In step A-2 of the method A for preparing a hydrophobic silica wet gel, the preparation of the hydrophobic silica wet gel may be performed by adding a first surface modifier, a second surface modifier, and an inorganic acid to the water glass-non-polar organic solvent layer separation composition prepared in step A-1, mixing, and reacting the mixture. In this case, the first surface modifier, the second surface modifier, and the inorganic acid may be simultaneously added to the water glass-non-polar organic solvent layer separation composition, or may be sequentially added in the order described above.

Also, after the addition of the first surface modifier, the second surface modifier, and the inorganic acid, a mixing process may be performed to increase reaction efficiency. In this case, the mixing process may be performed by a typical mixing method and is not particularly limited. Specifically, the mixing process may be performed by stirring. For example, the stirring may be performed at 300 rpm to 500 rpm for 1 hour to 3 hours using a magnetic bar, but the present invention is not limited thereto.

The first surface used in the preparation of the hydrophobic silica wet gel modifier may act to increase hydrophobicity of the silica wet gel by including a large amount of hydrophobic groups, specifically, two or more alkyl groups in one molecule. Specifically, the first surface modifier may be an akyldisilazane-based compound, and for example, may be a compound of Chemical Formula 1 below:

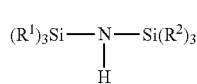

[Chemical Formula 1]

in Chemical Formula 1, $R^1$ each independently represent a hydrogen atom or an alkyl group having 1 to 8 carbon atoms, $R^2$ each independently represent a hydrogen atom or an alkyl group having 1 to 8 carbon atoms and, in $R^1$ and $R^2$, at least two functional groups are alkyl groups.

Since one molecule of the alkyldisilazane-based compound may react with two hydrophilic groups (—OH) on the surface of silica, a large amount of the alkyldisilazane-based compound may be required for the surface modification of the silica which is included in the water glass-non-polar organic solvent layer separation composition. However, since the alkyldisilazane-based compound has two or more alkyl groups, the alkyldisilazane-based compound may increase the degree of hydrophobicity. Specifically, examples of the silazane-based compound may be 1,2-diethyldisilazane, 1,1,2,2-tetramethyldisilazane, 1,1,3,3-tetramethyldisilazane, 1,1,1,2,2,2-hexamethyldisilazane, 1,1, 2,2-tetraethyldisilazane, or 1,2-diisopropyldisilazane, and these compounds may be used alone or in a mixture of two or more thereof.

Among the alkyldisilazane-based compounds of Chemical Formula 1, in order to further increase the hydrophobicity of the silica sol, the first surface modifier may be tetraalkyldisilazane including two hydrogen atoms as well as four alkyl groups having 1 to 4 carbon atoms, or hexaalkyldisilazane including six alkyl groups having 1 to 4 carbon atoms, and for example, may be hexamethyldisilazane (HMDS) or 1,1,3,3-tetramethyldisilazane.

Also, the first surface modifier may perform surface modification by reacting with silica which is included in the water glass-non-polar organic solvent layer separation composition and may simultaneously participate in gelation. Accordingly, the water glass solution and the first surface modifier may be used in a volume ratio of 1:0.03 to 1:0.15, specifically, 1:0.03 to 1:0.12, and for example, may be used in a volume ratio of 1:0.05 to 1:0.12. In this case, the water glass solution, as described above, may have different silica contents according to the first surface modifier, the second surface modifier, or the hydration thereof. However, if the water glass solution includes silica in an amount of 0.1 wt % to 30 wt % as described above, the first surface modifier may be added by adjusting its amount within the above volume ratio range. In the case that the first surface modifier is added in a volume ratio of less than 0.03, an effect of improving tap density may be insignificant, and in the case in which the first surface modifier is added in a volume ratio of greater than 0.15, an effect of improving the tap density and degree of hydrophobicity may be insignificant relative to the amount added.

Furthermore, the second surface modifier used in the preparation of the hydrophobic silica wet gel may have a small amount of hydrophobic groups. However, since the second surface modifier may include a large amount of reactive groups, which may react with a hydrophilic group, i.e., a hydroxy group, on the surface of silica, specifically, alkoxy groups, the second surface modifier may increase modification efficiency on the surface of silica and may simultaneously reduce the amount of the surface modifier used. Specifically, the second surface modifier may be an alkoxysilane-based compound including two or more or three or more alkoxy groups as reactive groups which may react with the hydrophilic group on the surface of silica. For example, the second surface modifier may be an alkoxysilane-based compound of Chemical Formula 2 below:

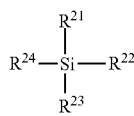

[Chemical Formula 2]

in Chemical Formula 2, $R^{21}$ to $R^{24}$ each independently represent an alkyl group having 1 to 4 carbon atoms or an alkoxy group having 1 to 4 carbon atoms, and at least two of $R^{21}$ to $R^{24}$ are alkoxy groups.

For example, the silane-based compound may include dimethyldimethoxysilane, dimethyldiethoxysilane, or methyltrimethoxysilane, and these compounds may be used alone or in a mixture of two or more thereof. Among these compounds, the second surface modifier may be a dialkyldialkoxysilane-based compound or alkyltrialkoxysilane-based compound, in which the modification efficiency on the surface of silica is high because one molecule may react with 2 or 3 hydrophilic groups on the surface of silica, and in this case, the alkyl group is an alkyl group having 1 to 4 carbon atoms. For example, the second surface modifier may be methyltrimethoxysilane (MTMS) or dimethyldimethoxysilane.

Also, like the first surface modifier, the second surface modifier may perform surface modification by reacting with the silica and may simultaneously participate in gelation. Accordingly, the water glass solution and the second surface modifier may be used in a volume ratio of 1:0.001 to 1:0.05 and, for example, may be used in a volume ratio of 1:0.001 to 1:0.04. In this case, the water glass solution, as described above, may have different silica contents according to the first surface modifier, the second surface modifier, or the hydration thereof. However, if the water glass solution includes silica in an amount of 0.1 wt % to 30 wt % as described above, the second surface modifier may be added by adjusting its amount within the above volume ratio range. In the case that the second surface modifier is added in a volume ratio of less than 0.001, an effect of decreasing tap density may be insignificant, and in the case in which the second surface modifier is added in a volume ratio of greater than 0.05, yield may be increased, but silica aerogel particles thus obtained become hard and the tap density may increase.

At least one of the first and second surface modifiers may be a hydrated compound. In the case that the first or second surface modifier is hydrated as described above, since the reactivity with silica is increased, surface modification may be more effectively achieved. As a result, a hydrophobic silica aerogel having excellent physical properties and pore characteristics as well as a high degree of hydrophobicity may be prepared.

Hydrates of the first and second surface modifiers may be prepared according to a typical method and used, or may be commercially obtained and used. Specifically, the hydrate of the first surface modifier may be prepared by mixing the first surface modifier with water in a weight ratio of 1:1 to 1:15 and then stirring for 20 hours to 30 hours. Also, the hydrate of the second surface modifier may be prepared by mixing the second surface modifier with water in a weight ratio of 1:0.5 to 1:2 and then stirring for 20 hours to 30 hours.

In the preparation of the hydrophobic silica wet gel, any combination of the first surface modifier and the second surface modifier is possible. That is, the first surface modifier may be hydrated and the second surface modifier may not be hydrated, or vice versa. Also, both the first surface modifier and the second surface modifier may be hydrated or may not be hydrated. For example, the first surface modifier may be hexamethyldisilazane and the second surface modifier may be hydrated methyltrimethoxysilane, or the first surface modifier may be hydrated hexamethyldisilazane and the second surface modifier may be methyltrimethoxysilane, or the first surface modifier may be hexamethyldisilazane and the second surface modifier may be methyltrimethoxysilane, or the first surface modifier may be hydrated hexamethyldisilazane and the second surface modifier may be hydrated methyltrimethoxysilane.

The first surface modifier and the second surface modifier may be used in a volume ratio of 1:0.01 to 1:0.9. In the case that the volume ratio of the first surface modifier and the second surface modifier, which are used for the preparation of the hydrophobic silica wet gel, is outside the above range, the surface modification efficiency on silica and the effect of increasing hydrophobicity may be insignificant and as a result, there is a risk of decreasing the yield of the finally prepared hydrophobic silica aerogel and increasing the tap density. For example, the first surface modifier and the second surface modifier may be used in a volume ratio of 1:0.04 to 1:0.6.

Since the inorganic acid used in the preparation of the hydrophobic silica wet gel may promote a reaction between the silica, which is included in the water glass-non-polar organic solvent layer separation composition, and the first and second surface modifiers by decomposing the first and second surface modifiers, the inorganic acid may facilitate surface hydrophobization of the silica. Also, the inorganic acid may facilitate gelation by controlling pH.

Specifically, the inorganic acid may include nitric acid, hydrochloric acid, sulfuric acid, acetic acid, or hydrofluoric acid, and any one thereof or a mixture of two or more thereof may be used. In consideration of the surface hydrophobization of the silica and the effect of promoting the gelation according to the use of the inorganic acid, the inorganic acid, for example, may be nitric acid. Also, an amount of the inorganic acid added is not particularly limited, but the inorganic acid may be used in an amount such that a pH value of the reaction system is in a range of 4 to 7.

Also, the inorganic acid may be added at a time or may be added in two divided portions. In the case that the inorganic acid is added in two divided portions, since the subsequently added inorganic acid may decompose the unreacted first and second surface modifiers to allow them to participate in the silica surface modification reaction, the subsequently added inorganic acid may further increase the hydrophobicity and yield of the silica aerogel.

Method B

As illustrated in FIG. 2B, the method B for preparing a hydrophobic silica wet gel includes the steps of adding a non-polar organic solvent to a water glass solution to prepare a water glass-non-polar organic solvent layer separation composition which includes a water glass solution layer and a non-polar organic solvent layer (step B-1); adding a first surface modifier and an inorganic acid to the water glass-non-polar organic solvent layer separation composition and reacting to prepare a first surface-modified silica wet gel (step B-2); and adding an inorganic acid and a second surface modifier to the first surface-modified silica wet gel and reacting to prepare a hydrophobic silica wet gel (step B-3).

In step B-1 of the method B for preparing a hydrophobic silica wet gel, the preparation of the water glass-non-polar organic solvent layer separation composition may be performed in the same manner as described in step A-1 of the method A.

Also, in step B-2 of the method B for preparing a hydrophobic silica wet gel, the preparation of the first surface-modified silica wet gel may be performed by adding the first surface modifier and the inorganic acid to the water glass-non-polar organic solvent layer separation composition that is prepared in step B-1, mixing, and reacting the mixture.

Types and amounts of the first surface modifier and the inorganic acid may be the same as those described in the method A. Also, the first surface modifier and the inorganic acid may be simultaneously added to the water glass-non-polar organic solvent layer separation composition, or may be sequentially added in the order described above. For example, the first surface modifier and the inorganic acid may be sequentially added in consideration of reaction efficiency.

Furthermore, after the addition of the first surface modifier and the inorganic acid, a mixing process may be performed to promote the reaction. In this case, the mixing process may be performed by a typical mixing method and is not particularly limited. Specifically, the mixing process may be performed by stirring. For example, the stirring may be performed at 400 rpm to 800 rpm for 10 minutes to 1 hour using a magnetic bar, but the present invention is not limited thereto.

In step B-3 of the method B for preparing a hydrophobic silica wet gel, the preparation of the hydrophobic silica wet gel may be performed by adding the inorganic acid and the second surface modifier to the first surface-modified silica wet gel that is prepared in step B-2, mixing, and reacting the mixture.

In step B-3, the inorganic acid may decompose the unreacted first surface modifier of the first surface modifier that is used in step B-2 to allow it to participate in the surface modification reaction, or may decompose the second surface modifier, which is simultaneously or subsequently added, to promote the surface modification reaction. Also, the second surface modifier may further hydrophobize the surface of the silica wet gel by reacting with a hydrophilic group (—OH) which may be present on the surface of the first surface-modified silica wet gel. Types and amounts of the inorganic acid and the second surface modifier may be the same as those described in the method A. The inorganic acid and the second surface modifier may be simultaneously added or sequentially added to the first surface-modified silica wet gel, and the inorganic acid and the second surface modifier may be sequentially added in consideration of reaction efficiency.

Furthermore, after the addition of the inorganic acid and the second surface modifier, a mixing process may be performed to promote the reaction. In this case, the mixing process may be performed by a typical mixing method and is not particularly limited. Specifically, the mixing process may be performed by stirring. For example, the stirring may be performed at 400 rpm to 800 rpm for 1 minute to 4 hours using a magnetic bar, but the present invention is not limited thereto.

Method C

As illustrated in FIG. 2C, the method C for preparing a hydrophobic silica wet gel includes the steps of passing a water glass solution through an ion exchange resin to prepare a silica sol (step C-1); and adding an inorganic acid, first and second surface modifiers, and a non-polar organic solvent to the silica sol and reacting to prepare a hydrophobic silica wet gel (step C-2).

In step C-1 of the method C for preparing a hydrophobic silica wet gel, the preparation of the silica sol may be performed by removing sodium ions in the water glass solution by passing the water glass solution through the ion exchange resin.

As described in the method A, the water glass solution used for the preparation of the silica sol is a dilute solution in which distilled water is added to water glass and mixed. Also, the water glass is not particularly limited, but may include silica ($SiO_2$) in an amount of 28 wt % to 35 wt %. The water glass solution diluted by adding the distilled water may include silica in an amount of 0.1 wt % to 30 wt %. In the case that the water glass is used without dilution, since the specific gravity of the water glass is high, it may take a long time for the water glass to pass the ion exchange resin.

As the ion exchange resin used in the preparation of the silica sol, any ion exchange resin may be used without particular limitation as long as it may remove sodium ions and is known in the art. Specifically, the ion exchange resin may be a cation exchange resin, an anion exchange resin, or an amphoteric ion exchange resin.

Specifically, the cation exchange resin may be one in which an end of a polymer side chain is covalent bonded to at least one cation exchange group selected from the group consisting of a sulfonic acid group (—$SO_3H$), a carboxylic acid group (—COOH), a phosphoric acid group (—$PO_3H_2$), and an iminoacetic acid group. In this case, the polymer may be polystyrene, polyacrylate, a perfluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyphenylquinoxaline-based polymer, and a polyetheretherketone-based polymer; or may be selected from the group consisting of copolymers thereof, such as a styrene/divinylbenzene copolymer. For example, the cation exchange resin may be a styrene-based or styrene/divinylbenzene resin-based strong acidic cation exchange resin including a sulfonic acid group; or a methacryl-based or acryl-based weak acidic cation exchange resin including a carboxylic acid group or iminoacetic acid group.

The anion exchange resin may be one in which an end of a polymer side chain is covalent bonded to an anion exchange group including a primary to tertiary nitrogen atom, and in this case, the polymer may be a polymer selected from the group consisting of polyolefin, polystyrene, polyacrylate, a perfluoro-based polymer, polyetheretherketone, polysulfon, and polyetherimide; or may be selected from the group consisting of copolymers thereof, such as a styrene/divinylbenzene copolymer. Specifically, the anion exchange group may be a primary to tertiary amino group, a quaternary ammonium group, a pyridyl group, an imidazolyl group, a quaternary pyridinium group, or a quaternary imidazolium group, and at least one anion exchange group thereof may be included. For example, the anion exchange resin may be a styrene-based or styrene/divinylbenzene-based strong basic anion exchange resin including a triethylammonium group or benzyldimethyl(2-hydroxyethyl)ammonium group; or an acryl-based or styrene-based weak basic anion exchange resin including a trimethylammonium group, tertiary amino group, or benzyltrialkylammonium group.

The amphoteric ion exchange resin may be a polymer including both sides of the cation exchange group and the anion exchange group by a covalent bond.

Among these ion exchange resins, the ion exchange resin may be the above-described strong acidic cation exchange resin in consideration of the production efficiency and processability of the silica sol.

The ion exchange resin may be directly prepared and used or may be commercially obtained and used. Specifically, the ion exchange resin may be DOWEX™ (DOW Chemical Company) modified with sulfonic acid, DUOLITE™, AMBERLYST™, or AMBERJET™ (Rohm and Haas Co.); or DOWEX™ (Dow Chemical Company) modified with carboxylic acid or AMBERLITE™ (Rohm and Haas Co.); or DOWEX™ (Dow Chemical Company) capable of exchanging both cation and anion.

The above-described ion exchange resin may be treated one or more times or three or more times with an equal volume of 1 M HCl to be reactivated and used.

Since the water glass solution passes through the ion exchange resin, sodium ions ($2Na^+$) in the water glass solution are substituted with hydrogen ions ($2H^+$) of an acid group in the ion exchange resin to form a hydrophilic silica sol (silicic acid, $Si(OH)_4$). In this case, an addition rate of the water glass solution is not particularly limited. However, the concentration of silica in the silica sol increases in proportion to speed as the speed of the water glass solution passing through the ion exchange resin increases, and more silica in the water glass may remain by being adsorbed on the surface of the ion exchange resin and gelated during an ion exchange process as the contact time between the ion exchange resin and the water glass solution increases because the speed is low. Accordingly, the speed of the water glass solution passing through the ion exchange resin may be specifically in a range of 20 ml/min to 40 ml/min.

A pH value of the silica sol prepared by introducing the water glass solution into the ion exchange resin may be in a range of 2.0 to 3.0. Also, the silica sol may be diluted so as to have different silica contents according to the first surface modifier and second surface modifier to be described later, or the hydration thereof. Specifically, in the case that the first surface modifier and second surface modifier to be described later are materials that are not hydrated, the silica sol may include silica in an amount of 3 wt % to 20 wt %, and in the case in which the first surface modifier, the second surface modifier, or the first and second surface modifiers are hydrated materials, the silica sol may include silica in an amount of 3 wt % to 30 wt %. That is, in the case that both the first surface modifier and the second surface modifier are materials that are not hydrated, for example, in the case that the first surface modifier is hexaalkyldisilazane and the second surface modifier is alkyltrialkoxysilane, the silica sol may include silica in an amount of 3 wt % to 20 wt %. In contrast, in the case in which at least one of the first surface modifier and the second surface modifier is a hydrated material, for example, in the case in which the first surface modifier is hydrated hexaalkyldisilazane and the second surface modifier is alkyltrialkoxysilane, the silica sol may include silica in an amount of 3 wt % to 30 wt %.

In the case that at least one of the first surface modifier and the second surface modifier is a hydrated material, since the silica sol may be further diluted by distilled water that is included in the hydrated material, the silica sol is diluted so as to have different silica contents in the silica sol according to the hydration of the first surface modifier.

Also, in step C-2 of the method C for preparing a hydrophobic silica wet gel, the preparation of a hydrophobic silica wet gel may be performed by adding an inorganic acid, first and second surface modifiers, and a non-polar organic solvent to the silica sol that is prepared in step C-1 and performing a reaction.

In this case, the inorganic acid, the first and second surface modifiers, and the non-polar organic solvent may be simultaneously added or sequentially added to the silica sol, and the inorganic acid, the first and second surface modifiers, and the non-polar organic solvent may be sequentially added in consideration of surface modification efficiency.

As described above, the silica sol may be diluted by adding distilled water so as to have different silica contents according to the type of the first surface modifier to be described later.

Furthermore, as described in the method A, the inorganic acid used in the preparation of the hydrophobic silica wet gel may react with the first surface modifier and the second surface modifier to decompose them. As a result, the inorganic acid may facilitate surface hydrophobization by promoting the reaction between the silica and the first and second surface modifiers, and may also facilitate gelation by controlling pH. Specifically, the same inorganic acid as used in the method A may be used as the inorganic acid, and the inorganic acid may be used in an amount equivalent to that of the method A, that is, an amount such that a pH value of the reaction system is in a range of 4 to 7.

Types and amounts of the first and second surface modifiers used in the preparation of the hydrophobic silica wet gel may be the same as those described in the method A. However, in consideration of adding the first and second surface modifiers to the silica sol in the method C, the the silica sol and first surface modifier may be used in a volume ratio of 1:0.03 to 1:0.15, for example, 1:0.03 to 1:0.1, and, specifically, may be used in a volume ratio of 1:0.05 to 1:0.08. In this case, the silica sol, as described above, may have different silica contents according to the first surface modifier, the second surface modifier, or the hydration thereof. However, if the silica sol includes silica in an amount of 3 wt % to 30 wt % as described above, the first surface modifier may be added by adjusting its amount within the above volume ratio range. In the case that the first surface modifier is added in a volume ratio of less than 0.03, the effect of decreasing tap density may be insignificant, and in the case in which the first surface modifier is added in a volume ratio of greater than 0.1, the effect of improving the tap density and degree of hydrophobicity may be insignificant relative to the amount added.

The second surface modifier may also be used in an amount equivalent to that of the method A. However, in consideration of adding the second surface modifier to the silica sol, the silica sol and the second surface modifier may be used in a volume ratio of 1:0.001 to 1:0.05, for example, 1:0.001 to 1:0.04, with respect to the silica sol. In this case, the silica sol, as described above, may include different silica contents according to the first surface modifier, the second surface modifier, or the hydration thereof. However, if the silica sol includes silica in an amount of 3 wt % to 30 wt % as described above, the second surface modifier may be added by adjusting its amount within the above volume ratio range. In the case that the second surface modifier is added in a volume ratio of less than 0.001, the effect of decreasing tap density may be insignificant, and in the case in which the second surface modifier is added in a volume ratio of greater than 0.05, yield may be increased, but particles thus obtained become hard and the tap density may increase.

The first surface modifier and the second surface modifier may be used in a volume ratio of 1:0.01 to 1:0.9. In the case that the volume ratio of the first surface modifier and the second surface modifier, which are added to the silica sol, is outside the above range, the effect of increasing yield and decreasing tap density may not only be insignificant but the degree of hydrophobicity may also be reduced. The first surface modifier and the second surface modifier may be used in a volume ratio of 1:0.01 to 1:0.9.

As described in the method A, the non-polar organic solvent used in the preparation of the hydrophobic silica wet gel may prevent the shrinkage of pores and cracking, which may occur when water present in a hollow of the wet gel is evaporated into a gas phase during the drying of the hydrophobic silica wet gel, by substituting the water present in the hollow of the hydrophobic silica wet gel prepared. As a result, the decrease in specific surface area and the changes in pore structure, which occur during the drying of the hydrophobic silica wet gel, may be prevented. Specifically, the non-polar organic solvent may be the same as that described in the method A and may be used in an amount equivalent to that of the method A. However, in consideration of adding the non-polar organic solvent to the silica sol in the method C, the silica sol and the non-polar organic solvent may be used in a volume ratio of 1:1 to 1:2, and, for example, may be used in a volume ratio of 1:1 to 1:1.5. In this case, the silica sol may include silica in an amount of 3 wt % to 30 wt %. In the case that the volume ratio of the non-polar organic solvent to the silica sol is less than 1, since the substitution ratio of the water present in the hollow of the hydrophobic silica wet gel may decrease, the effect of preventing the shrinkage of pores and cracking may be insignificant. As a result, the decrease in specific surface area and the changes in pore structure may occur during the drying of the hydrophobic silica wet gel. In contrast, in the case in which the volume ratio of the non-polar organic solvent to the silica sol is greater than 2, the improvement due to the increase in the amount of the non-polar organic solvent used may be insignificant, and there is a risk of decreasing process efficiency and increasing process time due to the use of an excessive amount of the non-polar organic solvent.

After the addition of the inorganic acid, the first and second surface modifiers, and the non-polar organic solvent, a mixing process may be performed to increase reaction efficiency. The mixing process may be performed by a typical mixing method and is not particularly limited. Specifically, the mixing process may be performed by stirring, and the stirring, for example, may be performed in a temperature range of 40° C. to 60° C. at 300 rpm to 500 rpm for 30 minutes or more or 1 hour to 4 hours.

Method D

As illustrated in FIG. 2D, the method D for preparing a hydrophobic silica wet gel includes the steps of passing a water glass solution through an ion exchange resin to prepare a silica sol (step D-1); adding an inorganic acid, a first surface modifier, and a non-polar organic solvent to the silica sol and reacting to prepare a first surface-modified silica wet gel (step D-2); and adding a second surface modifier to the first surface-modified silica wet gel and reacting to prepare a hydrophobic silica wet gel (step D-3).

In step D-1 of the method D for preparing a hydrophobic silica wet gel, the preparation of the silica sol may be the same as described in the method C.

In step D-2 of the method D for preparing a hydrophobic silica wet gel, the preparation of the first surface-modified silica wet gel may be performed by adding an inorganic acid, a first surface modifier, and a non-polar organic solvent to the silica sol that is prepared in step D-1 and performing a reaction.

In this case, the inorganic acid, the first surface modifier, and the non-polar organic solvent may be simultaneously added or sequentially added to the silica sol, and, in consideration of first surface modification efficiency, the inorganic acid, the first surface modifier, and, the non-polar organic solvent, for example, may be sequentially added in the order described above.

Types and amounts of the inorganic acid, the first surface modifier, and the non-polar organic solvent, which are used for the preparation of the first surface-modified silica wet gel, may be the same as those described in the method C.

After the addition of the inorganic acid, the first surface modifier, and the non-polar organic solvent to the silica sol during the preparation of the first surface-modified silica wet gel, a mixing process may be performed to increase reaction efficiency. The mixing process may be performed by a typical mixing method and is not particularly limited. Specifically, the mixing process may be performed by stirring, and the stirring, for example, may be performed at 400 rpm to 800 rpm for 10 minutes to 1 hour using a magnetic bar.

In step D-3 of the method D for preparing a hydrophobic silica wet gel, the preparation of the hydrophobic silica wet gel may be performed by adding a second surface modifier to the first surface-modified silica wet gel that is prepared in step D-2 and performing a reaction.

In this case, the second surface modifier may further hydrophobize the surface of the silica wet gel by reacting with a hydrophilic group (—OH) which may be present on the surface of the first surface-modified silica wet gel. Type and amount of the second surface modifier may be the same as those described in the method C.

After the addition of the second surface modifier to the first surface-modified silica wet gel during the preparation of the hydrophobic silica wet gel, a mixing process may be performed to increase reaction efficiency. The mixing process may be performed by a typical mixing method and is not particularly limited. Specifically, the mixing process may be performed by stirring, and the stirring, for example, may be performed at 400 rpm to 800 rpm for 1 minute to 4 hours using a magnetic bar.

A silica wet gel surface modified with a hydrophobic group may be prepared according to any one of the above-described methods A to D.

(Step 2)

Next, step 2 of preparing a hydrophobic silica aerogel according to an embodiment of the present invention is preparing a hydrophobic silica aerogel by washing and drying the hydrophobic silica wet gel which is prepared by various methods in step 1.

The washing process is for obtaining a high-purity hydrophobic silica aerogel by removing impurities (sodium ions, unreacted materials, by-product, etc.) which are generated during the preparation process of the hydrophobic silica wet gel, wherein the washing process may be simultaneously performed with the drying process, or may be separated from the drying process to be sequentially performed.

Specifically, in the case that the washing and drying processes are simultaneously performed, a solvent extraction method, such as a Soxhlet extraction method using a Soxhlet extractor, may be used. In general, the Soxhlet extractor is a device in which an extraction tube is disposed on a solvent flask and a reflux condenser is connected to the extraction tube, wherein, when a sample is put in a cylindrical filter paper or a filtration tube (thimble) in the extraction tube and a solvent in the flask is heated, the solvent is evaporated into a gas phase, the gas-phase solvent is condensed in the reflux condenser and fills the extraction tube to dissolve soluble components in the sample, the filled liquid is entirely returned to the solvent flask by a siphon arm when the liquid reaches the top of the siphon arm, and a new solvent fills the extraction tube again. When the extraction is repeated with the new solvent and the extraction is completed, the flask is detached and non-volatile components, i.e., the end product, remain in the flask by evaporating the liquid in the flask. According to the above-described operation, a dried product having impurities removed therefrom may be obtained by the solvent extraction method using the Soxhlet extractor.

Figure 3:
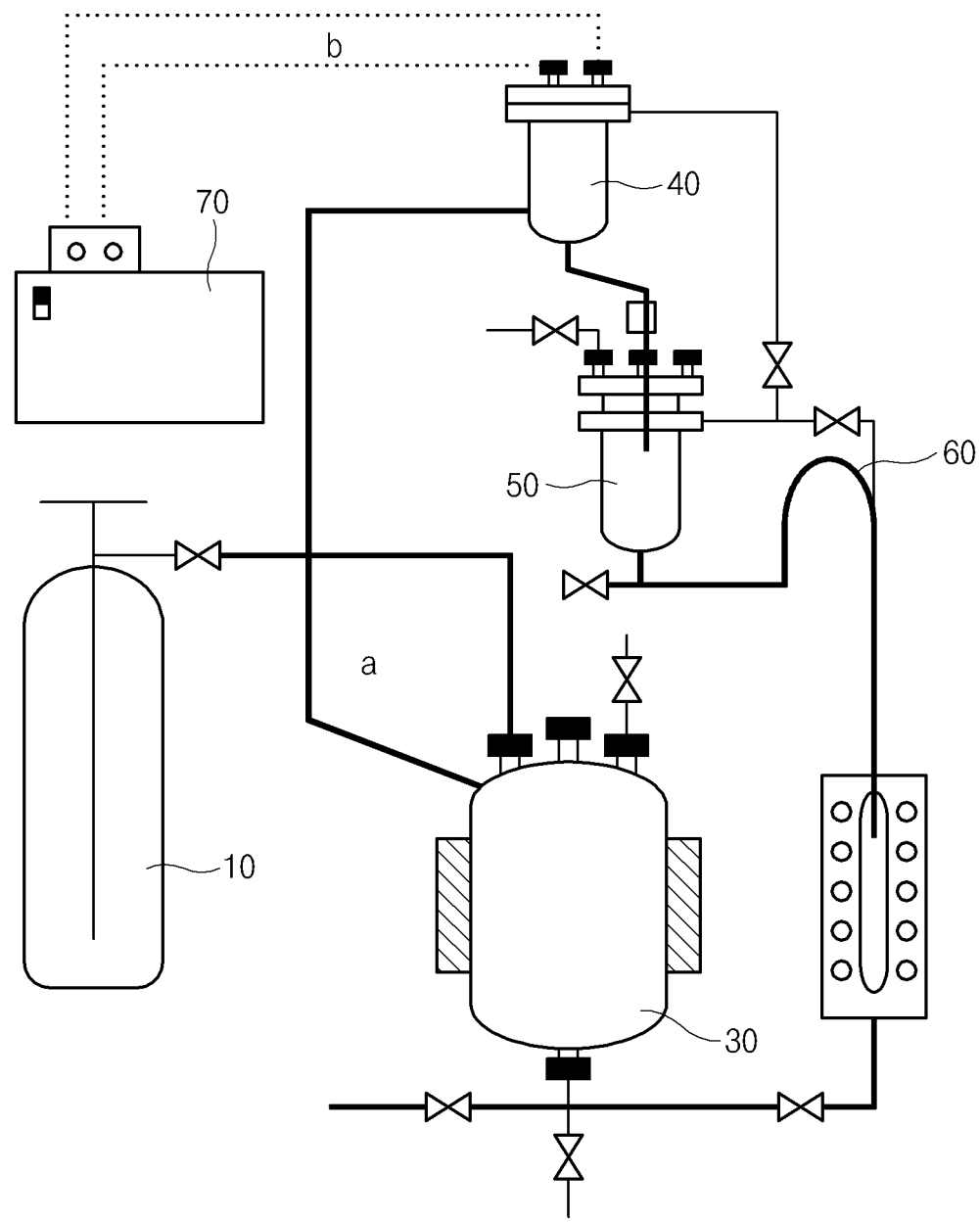
FIG. 3 is a structure diagram schematically illustrating a Soxhlet extractor which may be used in the preparation of the hydrophobic silica aerogel according to the embodiment of the present invention.

FIG. 3 is a structure diagram schematically illustrating a structure of a Soxhlet extractor for a Soxhlet extraction in the preparation of the hydrophobic silica aerogel according to the embodiment of the present invention. FIG. 3 is only an example for describing the present invention and the scope of the present invention is not limited thereto. Hereinafter, the present invention will be described in more detail with reference to FIG. 3.

As illustrated in FIG. 3, the Soxhlet extractor 100 includes a reboiler 30, a condenser 40, and an extractor 50, and may further include an extraction solvent reservoir 10 which is connected to the reboiler 30 to supply an extraction solvent to the reboiler 30, a cooling circulation tank 70 which is connected to the condenser 40 to maintain the temperature of cooling water in the condenser 40, and a siphon arm 60 which is connected to the extractor 50 to vent the extraction solvent from the extractor 50. Also, the reboiler 30, the condenser 40, and the extractor 50 may be connected to one another through a pipe to form loop 1(*a*), and the condenser 40 may be connected to the cooling circulation tank 70 through a pipe to form loop 2(*b*). Loop 1(*a*) is a pipeline through which the extraction solvent circulates during an extraction process, and loop 2(*b*) is a pipeline through which the cooling water circulates.

The solvent extraction method using the Soxhlet extractor 100 according to an embodiment of the present invention may be performed by the following steps:

Step (i) supplying a hydrophobic silica wet gel into the extractor 50;

Step (ii) performing an extraction by flowing an extraction solvent contained in the reboiler 30 into the extractor 50 including the hydrophobic silica wet gel through the condenser 40; and Step (iii) venting the extraction solvent, which is obtained as a result of the extraction, from the extractor 40.

Step (i) is a step of introducing a Soxhlet thimble filled with the hydrophobic silica wet gel into the extractor and assembling the extractor 50 in order to remove impurities (sodium ions, unreacted materials, by-product, water, etc.) in the hydrophobic silica wet gel and obtain a dried hydrophobic silica aerogel.

Step (ii) is a step of performing a Soxhlet extraction by flowing an extraction solvent contained in the reboiler 30 into the extractor 50 including the hydrophobic silica wet gel through the condenser 40, in order to extract the impurities by injecting the extraction solvent into the extractor 50.

The extraction solvent is evaporated in the reboiler 30 to be transferred to the condenser 40 through a pipe and the transferred extraction solvent is liquefied by the condenser 40 and injected into the extractor 50 through a pipe to perform an extraction. Once the extraction is complete, the extraction solvent used is vented from the extractor 50 to be returned to the reboiler 30. That is, the extraction solvent may extract the impurities in the hydrophobic silica wet gel while circulating along loop 1(*a*) in the sequence of the reboiler 30>>the condenser 40>>the extractor 50>>the reboiler 30. In particular, due to the siphon arm 60, when the liquefied extraction solvent fills the extractor 50 as high as the top of the siphon arm 60, all of the extracted solvent in the extractor 50 is automatically transferred to the reboiler 30 by gravitation, and the extraction of the impurities may be easily performed while the Soxhlet extraction process is repeated.

During the Soxhlet extraction, a temperature of the reboiler 30 may be in a range of 25° C. to 40° C., and a temperature of the condenser 40 may be in a range of −20° C. to 10° C. Also, the Soxhlet extraction may be performed in a pressure of 5 bar to 70 bar. In this case, the pressure may vary depending on the extraction solvent used. The Soxhlet extraction may be performed under the above-described conditions for 1 hour to 10 hours, but the present invention is not limited thereto.

As the extraction solvent usable during the Soxhlet extraction, any extraction solvent may be used as long as it is easily evaporated in the reboiler and is easily liquefied in the condenser. Specifically, a compound that exists in a gas phase under conditions including a temperature of 20° C. to 40° C. and a pressure of 0.5 atm to 1.5 atm may be used as the extraction solvent.

Also, the extraction solvent may have a vapor pressure at 20° C. of 100 kPa or more, specifically, 100 kPa to 10 MPa, so as to prevent the shrinkage and cracking of the pore structure in a silica sol by easily evaporating during the Soxhlet extraction process.

Furthermore, the extraction solvent may have low surface tension so as to prevent the shrinkage and cracking of the pore structure in the silica sol during the drying process. Specifically, the extraction solvent may have a surface tension of 12 mN/m or less, for example, 0.1 mN/m to 12 mN/m.

For example, the extraction solvent may be a non-polar solvent such as carbon dioxide; or a polar solvent, such as dimethyl ether, satisfying the above-described conditions. Specifically, the extraction solvent may be a non-polar solvent, such as carbon dioxide, satisfying the above-described conditions in consideration of excellence in solvent substitution.

The Soxhlet extraction may be performed in a pressure of 5 bar to 70 bar, and, in the case that the extraction solvent is carbon dioxide, the Soxhlet extraction may be performed in a pressure of 40 bar to 70 bar, for example, 40 bar to 60 bar. Also, in the case in which the extraction solvent is dimethyl ether, the Soxhlet extraction may be performed in a pressure of 5 bar to 20 bar.

Step (iii) is for obtaining a hydrophobic silica aerogel by removing the extraction solvent, which is obtained as a result of the extraction, from the extractor 50, and step (iii) may be performed by venting the extraction solvent by switching off the reboiler 30 and the condenser 40 and gradually increasing the temperature of the extractor 50 after the extraction of the impurities is completed. Also, when the extraction solvent is entirely vented to reach the atmospheric pressure, a hydrophobic silica aerogel may be obtained by opening the extractor 50.

Furthermore, after the Soxhlet extraction, a drying process, specifically, a vacuum drying process, for removing the extraction solvent which may remain in the silica aerogel may be selectively further performed. Accordingly, the method for preparing a hydrophobic silica aerogel according to the embodiment of the present invention may selectively further include the drying process, specifically, the vacuum drying process, after the Soxhlet extraction, and in this case, the drying process may be performed according to a typical method.

In the case that washing and drying are simultaneously performed using a solvent extraction method, such as a Soxhlet extraction, as described above, the impurities in the hydrophobic silica wet gel may not only be effectively extracted, but a hydrophobic silica aerogel may also be prepared without an additional drying process. Also, additionally, the solvent substitution of the hydrophobic silica wet gel, which is not subjected to the solvent substitution, may be simultaneously performed with the washing.

In the case in which the washing and the drying are separated and sequentially performed, the washing and drying methods are not particularly limited and may be performed by a method generally known in the art.

For example, the washing process may be performed by adding a non-polar organic solvent to the hydrophobic spherical silica wet gel and stirring for 20 minutes to 1 hour. The non-polar organic solvent may be the same as that described above.

For example, the drying process may be performed by separating and removing a water layer from the washed hydrophobic spherical silica wet gel, and then atmospheric drying in an oven at 60° C. to 100° C. for 6 hours to 12 hours.

According to another embodiment of the present invention, a hydrophobic silica aerogel prepared by the above-described preparation method is provided.

Specifically, since the hydrophobic silica aerogel prepared by the above-described preparation method may be more effectively surface-modified by the combined use of the first surface modifier and the second surface modifier, the hydrophobic silica aerogel may be hydrophobic silica aerogel powder having improved physical properties, such as low tap density and high specific surface area, and pore characteristics.

For example, in relation to the effect of improving the physical properties, the hydrophobic silica aerogel according to the embodiment of the present invention may have a specific surface area of 500 m$^2$/g to 800 m$^2$/g. Also, the hydrophobic silica aerogel may have a tap density of 0.05 g/ml to 0.17 g/ml. Furthermore, in relation to the effect of improving the pore characteristics, the silica aerogel may have a pore diameter of 10 nm to 15 nm and a pore volume of 2 cm$^3$/g to 5 cm$^3$/g. In this case, in the present invention, the tap density of the silica aerogel may be measured using a tap density tester (TAP-2S, Logan Instruments Co.), and the specific surface area, the pore diameter, and the pore volume may be measured by amounts of nitrogen, which were adsorbed and desorbed according to partial pressure $(0.11 < p/p_o < 1)$, using a Micromeritics ASAP 2010 analyzer.

In relation to the effect of increasing hydrophobicity, the silica aerogel may have a carbon content of 9% or more based on a total weight of the silica aerogel. In this case, in the present invention, the carbon content of the silica aerogel may be measured using a carbon analyzer.

Since the silica aerogel having low tap density and high specific surface area as well as high hydrophobicity may maintain low thermal conductivity, the silica aerogel may be used in various fields, such as insulation materials, ultra-low dielectric thin films, catalysts, catalyst supports, or blankets, and may be particularly suitable for the preparation of a blanket, in particular, an insulation blanket because the silica aerogel may maintain low thermal conductivity due to the above-described physical/pore characteristics.

Thus, according to another embodiment of the present invention, a blanket or insulation blanket prepared by using the hydrophobic silica aerogel is provided.

Specifically, the blanket may be prepared according to a typical method except that a composition including the hydrophobic silica aerogel is used. For example, at least one surface of a base material for a blanket is coated with the composition including the hydrophobic silica aerogel or the base material for a blanket is impregnated with the composition, and the blanket is then prepared by drying the base material. Also, a pressing process for adjusting the thickness of the blanket after the drying process and achieving uniform internal structure and surface morphology of the blanket, a molding process for obtaining an appropriate shape or morphology, or a laminating process for laminating a separate functional layer may be further performed.

The composition including the hydrophobic silica aerogel may further include at least one additive, such as a binder and a solvent, and selectively, a dispesant, a cross-linking agent, and a foaming agent, in addition to the hydrophobic silica aerogel.

As the base material for a blanket, various materials may be used depending on the application of the insulation blanket. Specifically, the base material for a blanket may be a film, a sheet, a net, fibers, a porous body, a foam body, a non-woven fabric body, or a laminate of two or more layers thereof. Also, the base material for a blanket may have surface roughness on its surface or may be patterned depending on the application thereof.

Specifically, the blanket may include a base material for a blanket and a hydrophobic silica aerogel that is disposed on at least one surface of the base material for a blanket. The blanket may further include a hydrophobic silica aerogel which is included in the base material for a blanket.

EXAMPLES

Hereinafter, the present invention will be described in more detail, according to the following examples and experimental examples. However, the following examples and experimental examples are merely presented to exemplify the present invention, and the scope of the present invention is not limited thereto.

Example 1-1

120 ml of hexane was added to 100 g (about 100 ml) of a water glass solution (include 4.35 wt % of silica) and the temperature was increased to 50° C. to prepare a water glass-non-polar organic solvent layer separation composition in which a water glass solution layer and a hexane layer were sequentially stacked. 6 ml of hexamethyldisilazane and 3.6 ml of nitric acid were sequentially added thereto and stirred to obtain a first surface-modified wet gel (pH 7 to 8). After 5 minutes, 0.5 ml of nitric acid was further added to the first surface-modified wet gel obtained, and after 10 minutes, 2.5 ml of methyltrimethoxysilane hydrated at 50 wt % was added, stirred for 3 hours, and reacted to obtain a hydrophobic silica wet gel. In this case, the hydrated methyltrimethoxysilane was prepared by mixing 10 g of methyltrimethoxysilane and 10 g of distilled water and stirring for 20 hours.

A water layer separated from the obtained hydrophobic silica wet gel was removed and washing was performed by adding 120 ml of hexane. The washing was repeated twice. The washed hydrophobic silica wet gel was dried in an oven at 150° C. for 1 hour to obtain a hydrophobic silica aerogel.

Example 1-2

A hydrophobic silica aerogel was obtained in the same manner as in Example 1-1 except that 1.1 ml of hydrated methyltrimethoxysilane was added.

Example 1-3

A hydrophobic silica aerogel was obtained in the same manner as in Example 1-1 except that 3.42 ml of hydrated methyltrimethoxysilane was added.

Example 1-4

120 ml of hexane was added to 100 g (about 100 ml) of a water glass solution (include 4.35 wt % of silica) and the temperature was increased to 50° C. to prepare a water glass-non-polar organic solvent layer separation composition in which a water glass solution layer and a hexane layer were sequentially stacked. 6 ml of hexamethyldisilazane, 3.42 ml of hydrated methyltrimethoxysilane, and 3.6 ml of nitric acid were sequentially added thereto and stirred to obtain a silica wet gel (pH 7 to 8). After 5 minutes, 0.5 ml of nitric acid was further added to the silica wet gel obtained, stirred for 3 hours, and reacted to obtain a hydrophobic silica wet gel. In this case, the hydrated methyltrimethoxysilane was prepared by mixing 10 g of methyltrimethoxysilane and 10 g of distilled water and stirring for 20 hours.

A water layer separated from the obtained hydrophobic silica wet gel was removed and washing was performed by adding 120 ml of hexane. The washing was repeated twice. The washed hydrophobic silica wet gel was dried in an oven at 150° C. for 1 hour to obtain a hydrophobic silica aerogel.

Example 1-5

A hydrophobic silica aerogel was obtained in the same manner as in Example 1-4 except that 12 ml of hexamethyldisilazane and 0.25 ml of hydrated methyltrimethoxysilane were added.

Example 1-6

A hydrophobic silica aerogel was obtained in the same manner as in Example 1-4 except that 12 ml of hexamethyldisilazane and 0.5 ml of hydrated methyltrimethoxysilane were added.

Example 1-7

A hydrophobic silica aerogel was obtained in the same manner as in Example 1-4 except that 12 ml of hexamethyldisilazane and 1 ml of hydrated methyltrimethoxysilane were added.

Example 1-8

A hydrophobic silica aerogel was obtained in the same manner as in Example 1-4 except that 6 ml of hexamethyldisilazane and 0.5 ml of hydrated methyltrimethoxysilane were added.

Example 1-9

A hydrophobic silica aerogel was obtained by washing and drying the hydrophobic silica wet gel, which was prepared in Example 1-1, using the following Soxhlet extraction method.

First, temperatures of a reboiler and a condenser were respectively set to 30° C. and 5° C., a Soxhlet thimble was filled with the hydrophobic silica wet gel when the temperatures were maintained, and the Soxhlet thimble was put in an extractor and assembled. Thereafter, the reboiler was filled with carbon dioxide ($CO_2$) so as to obtain a pressure of 60 bar, and the extraction was performed for 7 hours. The reboiler and the condenser were switched off after the extraction was completed, and carbon dioxide was vented while gradually increasing the temperature of the extractor to 60° C. In this case, since carbon dioxide and hydrophobic silica aerogel powder generated may freeze together in the thimble when rapidly venting the carbon dioxide, the carbon dioxide was slowly vented. After the venting, a hydrophobic silica aerogel was prepared without an additional drying process.

Comparative Example 1-1

120 ml of hexane was added to 100 g (about 100 ml) of a water glass solution (include 4.35 wt % of silica) and the temperature was increased to 50° C. to prepare a water glass-non-polar organic solvent layer separation composition in which a water glass solution layer and a hexane layer were sequentially stacked. 6 ml of hexamethyldisilazane and 3.6 ml of nitric acid were sequentially added thereto and stirred to perform gelation. 5 minutes after the gelation was in progress, 0.5 ml of nitric acid was further added and reacted for 3 hours to obtain a hydrophobic silica wet gel.

A water layer separated from the obtained hydrophobic silica wet gel was removed and washing was performed by adding 120 ml of hexane. The washing was repeated twice. Thereafter, the washed hydrophobic silica wet gel was dried in an oven at 150° C. for 1 hour to obtain a hydrophobic silica aerogel.

Comparative Example 1-2

A hydrophobic silica aerogel was obtained in the same manner as in Comparative Example 1-1 except that 12 ml of hexamethyldisilazane was added.

Experimental Example 1: Physical Property Evaluation

In order to compare physical properties of the hydrophobic silica aerogels prepared in Examples 1-1 to 1-8 and Comparative Examples 1-1 and 1-2, tap density, specific surface area, and carbon content were measured for each hydrophobic silica aerogel powder, and the results thereof are presented in Table 1 below.

(1) Tap Density

Tap density was measured using a tap density tester (TAP-2S, Logan Instruments Co.).

(2) Specific Surface Area (Brunauer-Emmett-Teller (BET) Surface Area), Pore Diameter ($D_p$), and Pore Volume ($V_p$)

Specific surface area, pore diameter, and pore volume were measured based on the amounts of nitrogen, which were adsorbed and desorbed according to partial pressure ($0.11 < p/p_o < 1$), using a Micromeritics ASAP 2010 analyzer.

(3) Carbon Content

Carbon contents were measured using a carbon analyzer.

TABLE 1

| Category | Amount obtained (g) | Tap density (g/ml) | Carbon content (wt %) | Specific surface area (m²/g) | Pore diameter (nm) | Pore volume (cm³/g) |
|---|---|---|---|---|---|---|
| Example 1-1 | 6.5 | 0.11 | 10.16 | 784 | 14.0 | 3.39 |
| Example 1-2 | 6.3 | 0.17 | 9.03 | 591 | 13.1 | 2.22 |
| Example 1-3 | 6.7 | 0.13 | 10.00 | 762 | 13.3 | 2.89 |
| Example 1-4 | 6.9 | 0.15 | 11.47 | 623 | 13.0 | 2.51 |
| Example 1-5 | 6.1 | 0.095 | 11.56 | 712 | 13.2 | 3.10 |
| Example 1-6 | 6.3 | 0.085 | 12.08 | 781 | 14.5 | 3.52 |
| Example 1-7 | 6.5 | 0.098 | 11.76 | 748 | 13.9 | 3.2 |
| Example 1-8 | 6.0 | 0.112 | 12.19 | 696 | 13.1 | 3.07 |
| Comparative Example 1-1 | 5.8 | 0.18 | 10.19 | 409 | 12.8 | 1.70 |
| Comparative Example 1-2 | 6.0 | 0.11 | 11.07 | 712 | 13.0 | 3.07 |

As illustrated in Table 1, the hydrophobic silica aerogels of Examples 1-1 and 1-8, which were prepared by using the first surface modifier and the second surface modifier according to the preparation method of the present invention, exhibited excellent pore characteristics as well as excellent physical properties such as low tap densities and high specific surface areas, and were prepared in high yields.

Specifically, when comparing Examples 1-1 to 1-4, and 1-8 and Comparative Example 1-1 which included the same amount, i.e., 6 ml, of HMDS as the first surface modifier, Examples 1-1 to 1-4 and 1-8, which included the hydrated MTMS second surface modifier as well as the HMDS first surface modifier, exhibited a significant improvement in terms of yield in comparison to Comparative Example 1-1 only including one type of the HMDS surface modifier. The reason for this is that the hydrated MTMS, which was added as the second surface modifier, acted as a silica source. Also, Examples 1-1 to 1-4 and 1-8 exhibited improvements in physical properties, such as tap density and specific surface area, and pore characteristics, such as pore diameter and pore volume, in comparison to Comparative Example 1-1.

When comparing Examples 1-5 to 1-7 and Comparative Example 1-2 which included 12 ml of HMDS by increasing the amount of the HMDS first surface modifier, Examples 1-5 to 1-7 which included the hydrated MTMS second surface modifier as well as the HMDS first surface modifier, similar to the above, exhibited improvements in physical properties, pore characteristics, and degree of hydrophobicity as well as yield in comparison to Comparative Example 1-2 only including one type of the HMDS surface modifier.

In addition, when comparing Examples 1-1 to 1-4 and 1-8, which included 6 ml of HMDS as the first surface modifier, with Comparative Example 1-2 only including 12 ml of HMDS, despite of using a much smaller amount of the surface modifier than that of Comparative Example 1-2, Examples 1-1 to 1-4 and 1-8 exhibited yield, physical properties, pore characteristics, and degree of hydrophobicity which were equal to or better than those of Comparative Example 1-2. From the above results, it may be understood that, in the case that a hydrophobic silica aerogel was prepared by mixing the first surface modifier and the second modifier as in the present invention, a hydrophobic silica aerogel having excellent physical properties and pore characteristics may be prepared in a high yield, despite of using a smaller amount of the surface modifier. In particular, in consideration of the fact that the HMDS surface modifier used in Comparative Example 1-2 was expensive and generated ammonia waste gas as a reaction byproduct, in the case in which a hydrophobic silica aerogel was prepared by the combined use of the first surface modifier and the second modifier as in the present invention, it may be expected that economic benefits and environmental improvement effects due to the reduction of the amount of the first surface modifier used were significant.

Also, when comparing Examples 1-1 to 1-3 in which the amount of the second surface modifier was variously changed, the yield of the hydrophobic silica aerogel was increased as the amount of the second surface modifier was increased. The physical properties and pore characteristics of the hydrophobic silica aerogel were improved until the amount of the second surface modifier was increased to a level of 2.5 ml. However, Example 1-3, in which the amount of the second surface modifier used was 3.42 ml, tended to have somewhat degraded physical properties and pore characteristics in comparison to Example 1-2, although better than those of Example 1-1. The result may be due to the fact that the possibility of the first surface modifier to react with a OH group on the surface of silica was reduced by the second surface modifier, the hydrated MTMS having a smaller amount of methyl group than that of the HMDS more reacted with the OH group on the surface of silica to reduce the overall degree of hydrophobicity, and the tap density was increased.

When examining Examples 1-5 to 1-7, for the same amount of the first surface modifier, yield increased as the amount of the second surface modifier increased similar to the above. In contrast, the tap density, degree of hydrophobicity, specific surface area, pore diameter, and pore volume were increased until the second surface modifier was added to an amount of 0.5 ml. However, in the case that the second surface modifier was further added to an amount of 1 ml, the tap density, degree of hydrophobicity, specific surface area, pore diameter, and pore volume were somewhat decreased. This result may also be due to the fact that the reaction rate of the second surface modifier with respect to the OH group on the surface of silica was increased due to the use of an excessive amount of the second surface modifier, and as a result, the degree of hydrophobicity of the finally prepared silica aerogel was reduced and the tap density was increased. From the above experimental results, it may be expect that an optimum mixing ratio may exist during the combined use of the first and second surface modifiers to prepare a hydrophobic silica aerogel having excellent physical properties and pore characteristics.

When comparing Examples 1-3 and 1-4 in which the times of adding the first surface modifier and the second modifier were different even if the same amounts of the first surface modifier and the second modifier were used, the hydrophobic silica aerogel of Example 1-3, which was prepared by dividedly adding the first surface modifier and the second surface modifier respectively before and after the gelation, exhibited further improvements in physical properties, such as tap density and specific surface area, and pore characteristics in comparison to Example 1-4 in which the first surface modifier and the second surface modifier were simultaneously added before the gelation. In contrast, Example 1-4, in which the first surface modifier and the second surface modifier were simultaneously added, exhibited better effect on the degree of hydrophobicity and yield of the silica aerogel. From the above results, it may be understood that it may be desirable to dividedly add the first and second surface modifiers respectively before and after the gelation in terms of the improvement in the physical properties and pore characteristics of the prepared silica aerogel, and it may be desirable to simultaneously add the first and second surface modifiers before the gelation in terms of the improvement in yield and degree of hydrophobicity.

Example 2-1

A water glass solution was prepared by adding distilled water to water glass (silica content: 28 to 30 wt %, $SiO_2$: $Na_2O$=3.52:1, YOUNG IL CHEMICAL COMPANY CO., LTD.) to obtain a silica content of 8 wt %, and a silica sol was then prepared by passing the water glass solution through a strong acidic ion exchange resin (Amberlite, IR 120H, Rohm & Haas Co.) at a rate of 30 ml/min to remove sodium ions in the water glass solution. An amount of silica in the prepared silica sol was about 6.9 wt %, and distilled water was added thereto so as to contain 3.9 wt % of silica to prepare a silica sol solution with a pH of 2.2.

The temperature of 100 g (about 100 ml) of the silica sol solution (include 3.9 wt % of silica) was increased to 50° C., and 0.795 ml of nitric acid and 5.2 ml of hexamethyldisilazane were then sequentially added thereto and stirred to obtain a first surface-modified wet gel. 120 ml of hexane was added thereto and, after 10 minutes, 0.975 ml of methyltrimethoxysilane hydrated at 50 wt % was added, stirred for 3 hours, and reacted to obtain a hydrophobic silica wet gel. In this case, the hydrated methyltrimethoxysilane was prepared by mixing 10 g of methyltrimethoxysilane and 10 g of distilled water and stirring for 20 hours.

A water layer separated from the obtained hydrophobic silica wet gel was removed and washing was performed by adding 120 ml of hexane. The washing was repeated twice. The washed hydrophobic silica wet gel was dried in an oven at 150° C. for 1 hour to obtain a hydrophobic silica aerogel.

Example 2-2

A hydrophobic silica aerogel was obtained in the same manner as in Example 2-1 except that 1.95 ml of hydrated methyltrimethoxysilane was added.

Example 2-3

A hydrophobic silica aerogel was obtained in the same manner as in Example 2-1 except that 2.9 ml of hydrated methyltrimethoxysilane was added.

Example 2-4

A hydrophobic silica aerogel was obtained in the same manner as in Example 2-1 except that 3.9 ml of hydrated methyltrimethoxysilane was added.

Example 2-5

A water glass solution was prepared by adding distilled water to water glass (silica content: 28 to 30 wt %, $SiO_2$:$Na_2O$=3.52:1, YOUNG IL CHEMICAL COMPANY CO., LTD.) to obtain a silica content of 8 wt %, and a silica sol was then prepared by passing the water glass solution through a strong acidic ion exchange resin (Amberlite, IR 120H, Rohm & Haas Co.) at a rate of 30 ml/min to remove sodium ions in the water glass solution. An amount of silica in the prepared silica sol was about 6.9 wt %, and distilled water was added thereto so as to contain 3.9 wt % of silica to prepare a silica sol solution with a pH of 2.2.

The temperature of 100 g (about 100 ml) of the silica sol solution (include 3.9 wt % of silica) was increased to 50° C., and 0.795 ml of nitric acid, 5.2 ml of hexamethyldisilazane, and 3.9 ml of hydrated methyltrimethoxysilane were then sequentially added thereto and stirred to obtain a silica wet gel. 120 ml of hexane was added thereto, stirred for 3 hours, and reacted to obtain a hydrophobic silica wet gel. In this case, the hydrated methyltrimethoxysilane was prepared by mixing 10 g of methyltrimethoxysilane and 10 g of distilled water and stirring for 20 hours.

A water layer separated from the obtained hydrophobic silica wet gel was removed and washing was performed by adding 120 ml of hexane. The washing was repeated twice. The washed hydrophobic silica wet gel was dried in an oven at 150° C. for 1 hour to obtain a hydrophobic silica aerogel.

Example 2-6

A hydrophobic silica aerogel was obtained by washing and drying the hydrophobic silica wet gel, which was prepared in Example 2-1, using the following Soxhlet extraction method.

First, temperatures of a reboiler and a condenser were respectively set to 30° C. and 5° C., a Soxhlet thimble was filled with the hydrophobic silica wet gel when the temperatures were maintained, and the Soxhlet thimble was put in an extractor and assembled. Thereafter, the reboiler was filled with carbon dioxide ($CO_2$) so as to obtain a pressure of 60 bar, and the extraction was performed for 7 hours. The reboiler and the condenser were switched off after the extraction was completed, and carbon dioxide was vented while gradually increasing the temperature of the extractor to 60° C. In this case, since carbon dioxide and hydrophobic silica aerogel powder generated may freeze together in the thimble when rapidly venting the carbon dioxide, the carbon dioxide was slowly vented. After the venting, a hydrophobic silica aerogel was prepared without an additional drying process.

Comparative Example 2-1

A water glass solution was prepared by adding distilled water to water glass (silica content: 28 to 30 wt %, $SiO_2$:$Na_2O$=3.52:1, YOUNG IL CHEMICAL COMPANY CO., LTD.) to obtain a silica content of 8 wt %, and a silica sol was then prepared by passing the water glass solution through a strong acidic ion exchange resin (Amberlite, IR 120H, Rohm & Haas Co.) at a rate of 30 ml/min to remove sodium ions in the water glass solution. An amount of silica in the prepared silica sol was about 6.9 wt %, and distilled water was added thereto so as to contain 3.9 wt % of silica to prepare a silica sol solution with a pH of 2.2.

The temperature of 100 g (about 100 ml) of the silica sol solution (include 3.9 wt % of silica) was increased to 50° C., and 0.795 ml of nitric acid and 5.2 ml of hexamethyldisilazane were then sequentially added thereto and stirred to perform gelation. 120 ml of hexane was added thereto and reacted for 3 hours to obtain a hydrophobic silica wet gel. A water layer separated from the obtained hydrophobic silica wet gel was removed and washing was performed by adding 120 ml of hexane. The washing was repeated twice. Thereafter, the washed hydrophobic silica wet gel was dried in an oven at 150° C. for 1 hour to obtain a hydrophobic silica aerogel.

Comparative Example 2-2

A hydrophobic silica aerogel was obtained in the same manner as in Comparative Example 2-1 except that 11.6 ml of hexamethyldisilazane and 1.59 ml of nitric acid were added.

Experimental Example 2: Physical Property Evaluation

In order to compare physical properties of the hydrophobic silica aerogels prepared in Examples 2-1 to 2-5 and Comparative Examples 2-1 and 2-2, tap density and carbon content of each powder were measured in the same manner as in Experimental Example 1, and the results thereof are presented in Table 2 below.

TABLE 2

| Category | Amount obtained (g) | Tap density (g/ml) | Carbon content (wt %) | Specific surface area ($m^2/g$) | Pore diameter (nm) | Pore volume ($cm^3/g$) |
|---|---|---|---|---|---|---|
| Example 2-1 | 4.7 | 0.13 | 12.1 | 632 | 13.6 | 2.75 |
| Example 2-2 | 4.9 | 0.10 | 12.1 | 738 | 14.3 | 3.28 |
| Example 2-3 | 5.0 | 0.12 | 11.6 | 691 | 13.2 | 3.01 |
| Example 2-4 | 5.1 | 0.12 | 11.5 | 646 | 13.8 | 2.91 |
| Example 2-5 | 5.0 | 0.14 | 12.0 | 612 | 13.1 | 2.89 |
| Comparative Example 2-1 | 4.6 | 0.14 | 12.1 | 598 | 12.7 | 2.39 |
| Comparative Example 2-2 | 4.7 | 0.09 | 11.9 | 712 | 13.6 | 3.02 |

As illustrated in Table 2, the hydrophobic silica aerogels of Examples 2-1 to 2-5, which were prepared by adding the first surface modifier and the second surface modifier according to the preparation method according to the embodiment of the present invention, exhibited the same levels of tap densities and carbon contents as Comparative Example 2-1 using one type of surface modifier. However, since the second surface modifier acted as a silica source, the hydrophobic silica aerogels of Examples 2-1 to 2-5 exhibited better improvement in yield. Also, the hydrophobic silica aerogels of Examples 2-1 to 2-5 exhibited the same levels of physical properties and degree of hydrophobicity as well as better yield despite of using a smaller amount of the surface modifier than that of Comparative Example 2-2 in which the amount of the surface modifier was significantly increased.

From the above results, it may be understood that, in the case that a hydrophobic silica aerogel was prepared by the combined use of the first surface modifier and the second modifier as in the present invention, a hydrophobic silica aerogel having excellent physical properties and pore characteristics may be prepared in a high yield, despite of using a smaller amount of the surface modifier.

Also, when comparing Examples 2-1 to 2-4 in which the amount of the second surface modifier was variously changed, the yield of the hydrophobic silica aerogel was increased as the amount of the second surface modifier was increased. In terms of the physical properties and the degree of hydrophobicity, the hydrophobic silica aerogels of Examples 2-1 to 2-4 exhibited improved physical properties, such as a decrease in tap density, while exhibiting the same carbon content until the amount of the second surface modifier was increased from 0.975 ml to 1.95 ml. However, when the amount of the second surface modifier used was greater than 1.95 ml, the tap density was increased and the carbon content was decreased. From the above results, it may be expect that an optimum mixing ratio may exist during the combined used of the first and second surface modifiers to prepare a hydrophobic silica aerogel having excellent physical properties and pore characteristics.

When comparing Examples 2-4 and 2-5 in which the times of adding the first surface modifier and the second modifier were different even if the same amounts of the first surface modifier and the second modifier were used, the hydrophobic silica aerogel of Example 2-4, which was prepared by dividedly adding the first surface modifier and the second surface modifier respectively before and after the gelation, exhibited no significant difference in terms of yield in comparison to Example 2-5 in which the first surface modifier and the second surface modifier were simultaneously added before the gelation. However, Example 2-4 exhibited a great improvement in the tap density and Example 2-5 exhibited a great improvement in the degree of hydrophobicity according to the increase in the carbon content. From the above results, similar to the results of Experimental Example 1, it may be understood that it may be desirable to dividedly add the first and second surface modifiers respectively before and after the gelation in terms of the improvement in the physical properties of the silica aerogel and it may be desirable to simultaneously add the first and second surface modifiers before the gelation in terms of the improvement in the degree of hydrophobicity.

From the above experimental results, it may be understood that a hydrophobic silica aerogel having excellent physical properties and pore characteristics as well as a high degree of hydrophobicity may be prepared with high efficiency by the method for preparing a hydrophobic silica aerogel according to the embodiment of the present invention, in which the first surface modifier and the second modifier are combined used, despite of the reduction of the amount of the surface modifier used. Also, it may be expected that manufacturing costs as well as the amount of waste gas generated as a byproduct during a preparation process of the silica aerogel may be reduced due to the reduction of the total amount of the surface modifier used.

Experimental Example 3

In order to investigate the effects due to the hydration of the surface modifier during the preparation of hydrophobic silica aerogel, hydrophobic silica aerogels were prepared by respectively using first and second surface modifiers as listed in Table 3 below.

Yields, tap densities, specific surface areas, pore diameters, pore volumes, and carbon contents of the prepared hydrophobic silica aerogels were measured in the same manner as in Experimental Example 1, and the results thereof, as well as the results of Examples 1-1 and 2-4, are presented in Table 4 below.

TABLE 3

| Category | First surface modifier (amount, ml) | Second surface modifier (amount, ml) | Preparation method |
|---|---|---|---|
| Example 3-1 | HMDS (6 ml) | MTMS (2.5 ml) | Example 1-1 |
| Example 3-2 | Hydrated HMDS (6 ml) | MTMS (2.5 ml) | Example 1-1 |
| Example 3-3 | Hydrated HMDS (6 ml) | Hydrated MTMS (2.5 ml) | Example 1-1 |
| Example 3-4 | HMDS (5.2 ml) | MTMS (3.9 ml) | Example 2-4 |
| Example 3-5 | Hydrated HMDS (5.2 ml) | MTMS (3.9 ml) | Example 2-4 |
| Example 3-6 | Hydrated HMDS (5.2 ml) | Hydrated MTMS (3.9 ml) | Example 2-4 |

TABLE 4

| Category | Amount obtained (g) | Tap density (g/ml) | Carbon content (wt %) | Specific surface area (m$^2$/g) | Pore diameter (nm) | Pore volume (cm$^3$/g) |
|---|---|---|---|---|---|---|
| Example 3-1 | 6.0 | 0.17 | 8.89 | 598 | 12.2 | 1.98 |
| Example 3-2 | 6.2 | 0.14 | 9.23 | 698 | 13.1 | 2.87 |
| Example 3-3 | 6.3 | 0.12 | 9.98 | 712 | 13.7 | 3.12 |
| Example 1-1 | 6.5 | 0.11 | 10.16 | 784 | 14.0 | 3.39 |
| Example 3-4 | 4.6 | 0.16 | 9.12 | 538 | 12.8 | 2.01 |
| Example 3-5 | 4.8 | 0.14 | 9.87 | 582 | 12.5 | 2.11 |
| Example 3-6 | 5.0 | 0.12 | 10.39 | 619 | 13.1 | 2.69 |
| Example 2-4 | 5.1 | 0.12 | 11.5 | 646 | 13.8 | 2.91 |

As illustrated in Table 4, in a case where at least one of the first and second surface modifiers was hydrated (Examples 1-1, 3-2, 3-3, 2-4, 3-5, and 3-6), hydrophobic silica aerogels having more improved physical properties and pore characteristics were prepared with high yields in comparison to a case in which any one of the first and second surface modifiers was not hydrated (Examples 3-1 and 3-4). The result may be due to the fact that the amount of the reaction group reactable with silica was increased by the hydration of the first or second surface modifier.

Also, a case, in which a hydration treatment was performed on the second surface modifier of the first and second surface modifiers, exhibited more improvement than a case in which both the first and second surface modifiers were hydrated. Furthermore, the case, in which both the first and second surface modifiers were hydrated, exhibited more improvement than a case in which a hydration treatment was performed on the first surface modifier. The result may be due to the fact that the reactivity with the unreacted reactive group remaining without reaction with the first surface modifier was further increased by increasing the reactivity of the second surface modifier, which was subsequently added compared to the first surface modifier, through the hydration treatment, and as a result, the surface modification effect was improved.

Experimental Example 4

Hydrophobic silica aerogels were prepared by variously changing types of first and second surface modifiers as listed in Table 5 below. Yields, tap densities, specific surface areas, pore diameters, pore volumes, and carbon contents of the prepared hydrophobic silica aerogels were measured in the same manner as in Experimental Example 1, and the results thereof, as well as the results of Example 1-1, are presented in Table 6 below.

TABLE 5

| Category | First surface modifier (amount, ml) | Second surface modifier (amount, ml) | Preparation method |
| --- | --- | --- | --- |
| Example 4-1 | 1,1,3,3-tetramethyldisilazane (6 ml) | MTMS (2.5 ml) | Example 1-1 |
| Example 4-2 | 1,1,3,3-tetramethyldisilazane (6 ml) | Hydrated MTMS (2.5 ml) | Example 1-1 |
| Example 4-3 | HMDS (6 ml) | Dimethyldimethoxysilane (DMDMS) (2.5 ml) | Example 1-1 |
| Example 4-4 | Hydrated HMDS (6 ml) | DMDMS (2.5 ml) | Example 1-1 |
| Example 4-5 | HMDS (6 ml) | Hydrated DMDMS (2.5 ml) | Example 1-1 |

TABLE 6

| Category | Amount obtained (g) | Tap density (g/ml) | Carbon content (wt %) | Specific surface area (m²/g) | Pore diameter (nm) | Pore volume (cm³/g) |
| --- | --- | --- | --- | --- | --- | --- |
| Example 1-1 | 6.5 | 0.11 | 10.16 | 784 | 14.0 | 3.39 |
| Example 4-1 | 5.8 | 0.18 | 8.97 | 443 | 12.1 | 1.97 |
| Example 4-2 | 6.2 | 0.13 | 9.21 | 561 | 13.1 | 2.94 |
| Example 4-3 | 6.1 | 0.16 | 9.68 | 543 | 12.5 | 2.46 |
| Example 4-4 | 6.3 | 0.15 | 10.19 | 612 | 13.5 | 2.91 |
| Example 4-5 | 6.7 | 0.11 | 11.12 | 728 | 14.2 | 3.83 |

As illustrated in Tables 5 and 6, although there were somewhat differences according to the types of the first and second surface modifiers, hydrophobic silica aerogels having improved physical properties and pore characteristics were prepared with high yields according to Examples 4-1 to 4-5.

Specifically, a case, in which the second surface modifier of the first surface modifier and the second surface modifier was hydrated, exhibited better effect. Also, a case of using HMDS as the first surface modifier exhibited better effect than a case of using 1,1,3,3-tetramethyldisilazane.

INDUSTRIAL APPLICABILITY

A hydrophobic silica aerogel having excellent physical properties and pore characteristics as well as a high degree of hydrophobicity may be prepared with high efficiency by the preparation method according to the present invention. Accordingly, the silica aerogel prepared by the above preparation method may be suitable for various fields, such as insulation materials, catalysts, and low dielectric thin films.

The invention claimed is:

1. A method for preparing a hydrophobic silica aerogel, the method comprising:
   preparing a hydrated second surface modifier by mixing a second surface modifier with water in a weight ratio of from 1:0.5 to 1:2 and stirring for 20 to 30 hours;
   preparing a hydrophobic silica wet gel by adding a first surface modifier, the hydrated second surface modifier, a non-polar organic solvent, and an inorganic acid to a water glass solution and performing a reaction; and
   washing and drying the hydrophobic silica wet gel, wherein:
   the first surface modifier comprises two or more hydrophobic groups in one molecule, and
   the hydrated second surface modifier comprises two or more reactive groups reactable with a hydrophilic group on a surface of silica.

2. The method of claim 1, wherein the water glass solution comprises silica in an amount of 0.1 wt % to 30 wt %.

3. The method of claim 1, wherein the water glass solution and the first surface modifier are added in a volume ratio of 1:0.03 to 1:0.15.

4. The method of claim 1, wherein the water glass solution and the hydrated second surface modifier are added in a volume ratio of 1:0.001 to 1:0.05.

5. The method of claim 1, wherein
the water glass solution comprises silica in an amount of 3 wt % to 30 wt %.

6. The method of claim 1, wherein the first surface modifier and the hydrated second surface modifier are added in a volume ratio of 1:0.01 to 1:0.9.

7. The method of claim 1, wherein the first surface modifier comprises any one selected from the group consisting of an alkyldisilazane-based compound and a hydrate thereof, or a mixture of two or more thereof.

8. The method of claim 1, wherein the first surface modifier comprises any one selected from the group consisting of an alkyldisilazane-based compound of Chemical Formula 1 and a hydrate thereof, or a mixture of two or more thereof:

[Chemical Formula 1]

wherein each $R^1$ independently is a hydrogen atom or an alkyl group having 1 to 8 carbon atoms, each $R^2$ independently is a hydrogen atom or an alkyl group having 1 to 8 carbon atoms and, in $R^1$ and $R^2$, at least two functional groups are alkyl groups.

9. The method of claim 1, wherein the first surface modifier comprises any one selected from the group consisting of hexaalkyldisilazane, tetraalkyldisilazane, and a hydrate thereof, or a mixture of two or more thereof.

10. The method of claim 1, wherein the first surface modifier comprises any one selected from the group consisting of hexamethyldisilazane and hydrated hexamethyldisilazane, or a mixture thereof.

11. The method of claim 1, wherein the second surface modifier comprises an alkoxysilane-based compound including two or more alkoxy groups in one molecule, or a mixture of two or more thereof.

12. The method of claim 1, wherein the second surface modifier comprises an alkoxysilane-based compound of Chemical Formula 2, or a mixture of two or more thereof:

[Chemical Formula 2]

wherein $R^{21}$ to $R^{24}$ each independently is an alkyl group having 1 to 4 carbon atoms or an alkoxy group having 1 to 4 carbon atoms, and at least two of $R^{21}$ to $R^{24}$ are alkoxy groups.

13. The method of claim 1, wherein the second surface modifier comprises an alkyltrialkoxysilane, a dialkyldialkoxysilane, or a mixture of two or more thereof.

14. The method of claim 1, wherein the second surface modifier comprises methyltrimethoxysilane, dimethyldimethoxysilane, or a mixture thereof.

15. The method of claim 1, wherein the non-polar organic solvent comprises any one selected from the group consisting of hexane, heptane, toluene, and xylene, or a mixture of two or more thereof.

16. The method of claim 1, wherein the water glass solution and the non-polar organic solvent are added in a volume ratio of 1:1 to 1:2.

17. The method of claim 1, wherein the inorganic acid comprises any one selected from the group consisting of nitric acid, hydrochloric acid, sulfuric acid, acetic acid, and hydrofluoric acid, or a mixture of two or more thereof.

18. The method of claim 1, wherein the preparing of the hydrophobic silica wet gel is performed in a temperature range of 40° C. to 60° C.

19. The method of claim 1, wherein solvent substitution, surface modification, and gelation are simultaneously performed during the preparation of the hydrophobic silica wet gel.

20. The method of claim 1, wherein the hydrophobic silica wet gel is prepared by adding the non-polar organic solvent to the water glass solution to prepare a water glass-non-polar organic solvent layer separation composition which includes a water glass solution layer and a non-polar organic solvent layer; and adding the first surface modifier, the hydrated second surface modifier, and the inorganic acid to the water glass-non-polar organic solvent layer separation composition and performing a reaction.

21. The method of claim 20, wherein the first surface modifier, the hydrated second surface modifier, and the inorganic acid are simultaneously added or sequentially added to the water glass-non-polar organic solvent layer separation composition.

22. The method of claim 20, wherein the inorganic acid is added in two divided portions to the water glass-non-polar organic solvent layer separation composition.

23. The method of claim 1, wherein the hydrophobic silica wet gel is prepared by adding the non-polar organic solvent to the water glass solution to prepare a water glass-non-polar organic solvent layer separation composition which includes a water glass solution layer and a non-polar organic solvent layer; adding the first surface modifier and an inorganic acid to the water glass-non-polar organic solvent layer separation composition and reacting to prepare a first surface-modified silica wet gel; and adding an inorganic acid and the hydrated second surface modifier to the first surface-modified silica wet gel and performing a reaction.

24. The method of claim 1, wherein the hydrophobic silica wet gel is prepared by passing the water glass solution through an ion exchange resin to prepare a silica sol; and adding the inorganic acid, the first surface modifier, the hydrated second surface modifier, and the non-polar organic solvent to the silica sol and performing a reaction.

25. The method of claim 24, wherein the inorganic acid, the first surface modifier, the hydrated second surface modifier, and the non-polar organic solvent are simultaneously added or sequentially added to the silica sol.

26. The method of claim 24, wherein the ion exchange resin is selected from the group consisting of a cation exchange resin, an anion exchange resin, or an amphoteric ion exchange resin.

27. The method of claim 24, wherein the ion exchange resin is a strong acidic cation exchange resin.

28. The method of claim 1, wherein the hydrophobic silica wet gel is prepared by passing the water glass solution through an ion exchange resin to prepare a silica sol; adding the inorganic acid, the first surface modifier, and the non-polar organic solvent to the silica sol and reacting to prepare a first surface-modified silica wet gel; and adding the hydrated second surface modifier to the first surface-modified silica wet gel and performing a reaction.

29. The method of claim 1, wherein the washing and the drying of the hydrophobic silica wet gel is performed by a solvent extraction method.

30. The method of claim 1, wherein the washing and the drying of the hydrophobic silica wet gel is performed by a Soxhlet extraction method.

31. A hydrophobic silica aerogel prepared by the method of claim 1.

32. The hydrophobic silica aerogel of claim 31, wherein the hydrophobic silica aerogel has a specific surface area of 500 $m^2$/g to 800 $m^2$/g.

33. The hydrophobic silica aerogel of claim 31, wherein the hydrophobic silica aerogel has a tap density of 0.05 g/ml to 0.17 g/ml.

34. The hydrophobic silica aerogel of claim 31, wherein the hydrophobic silica aerogel has a pore diameter of 10 nm to 15 nm and a pore volume of 2 $cm^3$/g to 5 $cm^3$/g.

35. The hydrophobic silica aerogel of claim 31, wherein the hydrophobic silica aerogel is hydrophobic silica aerogel powder.

36. A blanket comprising the hydrophobic silica aerogel which is prepared by the method of claim 1.

* * * * *